United States Patent [19]

Miller et al.

[11] 4,247,843
[45] Jan. 27, 1981

[54] AIRCRAFT FLIGHT INSTRUMENT DISPLAY SYSTEM

[75] Inventors: Harry Miller, Scottsdale; Parm L. Narveson, Phoenix; William R. Hancock, Phoenix; Joseph P. Hsu, Phoenix, all of Ariz.

[73] Assignee: Sperry Corporation, New York, N.Y.

[21] Appl. No.: 936,275

[22] Filed: Aug. 23, 1978

Related U.S. Application Data

[62] Division of Ser. No. 788,702, Apr. 19, 1977, Pat. No. 4,149,148.

[51] Int. Cl.³ .................... G01C 23/00; G06K 15/20; G01C 21/00
[52] U.S. Cl. .................. 340/27 NA; 116/DIG. 43; 244/181; 340/721; 340/724; 340/734; 340/747; 340/750
[58] Field of Search .......... 340/27 R, 27 AT, 27 NA, 340/27 SS, 721; 73/178 R, 178 T; 358/103; 364/427, 428, 432, 433, 434, 435, 443; 244/181, 182; 116/DIG. 43; 35/12 N, 12 F

[56] References Cited

U.S. PATENT DOCUMENTS

| 2,685,226 | 8/1954 | Crane | 340/27 NA |
|---|---|---|---|
| 3,307,191 | 2/1967 | Crane | 73/178 T |
| 3,520,994 | 7/1970 | McAfee et al. | 340/27 AT |
| 3,521,228 | 7/1970 | Congleton et al. | 340/27 NA |
| 3,668,622 | 6/1972 | Gannett et al. | 340/27 NA |
| 4,040,005 | 8/1977 | Melvin | 340/27 NA |
| 4,057,782 | 11/1977 | Muller | 340/27 NA |
| 4,133,503 | 1/1979 | Bliss | 340/27 SS |

*Primary Examiner*—John W. Caldwell, Sr.
*Assistant Examiner*—James J. Groody
*Attorney, Agent, or Firm*—Howard P. Terry; Albert B. Cooper

[57] ABSTRACT

Apparatus for providing an integrated display of flight instrument parameters on the screen of a single cathode ray tube is presented. The synthetically generated symbology provides the pilot with an integrated display of substantially all aircraft attitude and flight path command and control parameters including attitude and magnetic heading, barometric and radiometric attitude, vertical spread, critical take-off speeds, true airspeed and Mach airspeed, flight path angle, flight director path control commands, and mode annunciation for the flight director and automatic pilot systems.

19 Claims, 22 Drawing Figures

TYPICAL INTEGRATED FLIGHT INSTRUMENT DISPLAY FORMAT $\theta$ = PITCH ANGLE
$\phi_1$ = ROLL ANGLE INDEX
$k$ = PITCH SCALE FACTOR
$A = B \tan \phi - \dfrac{k\theta}{\cos \phi_1}$

ROLL, PITCH AND FLIGHT DIRECTOR SYMBOLOGY

TYPICAL INTEGRATED FLIGHT INSTRUMENT DISPLAY FORMAT

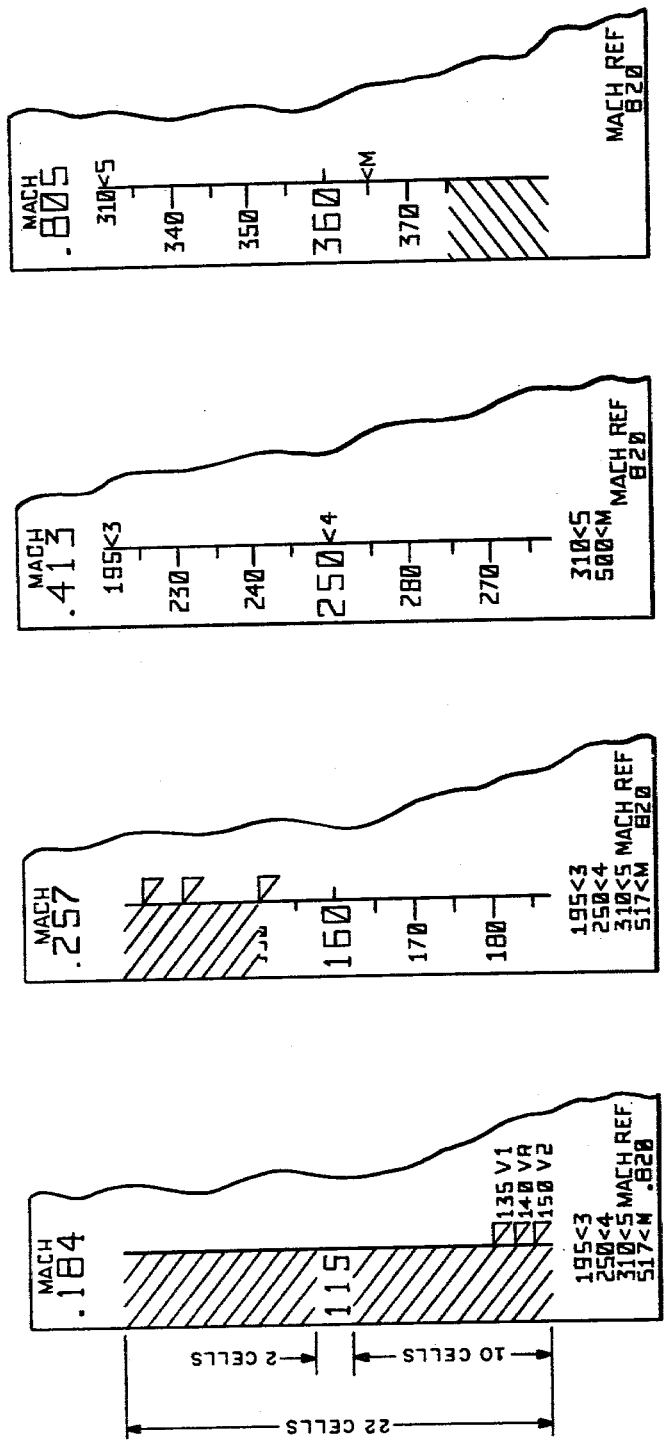

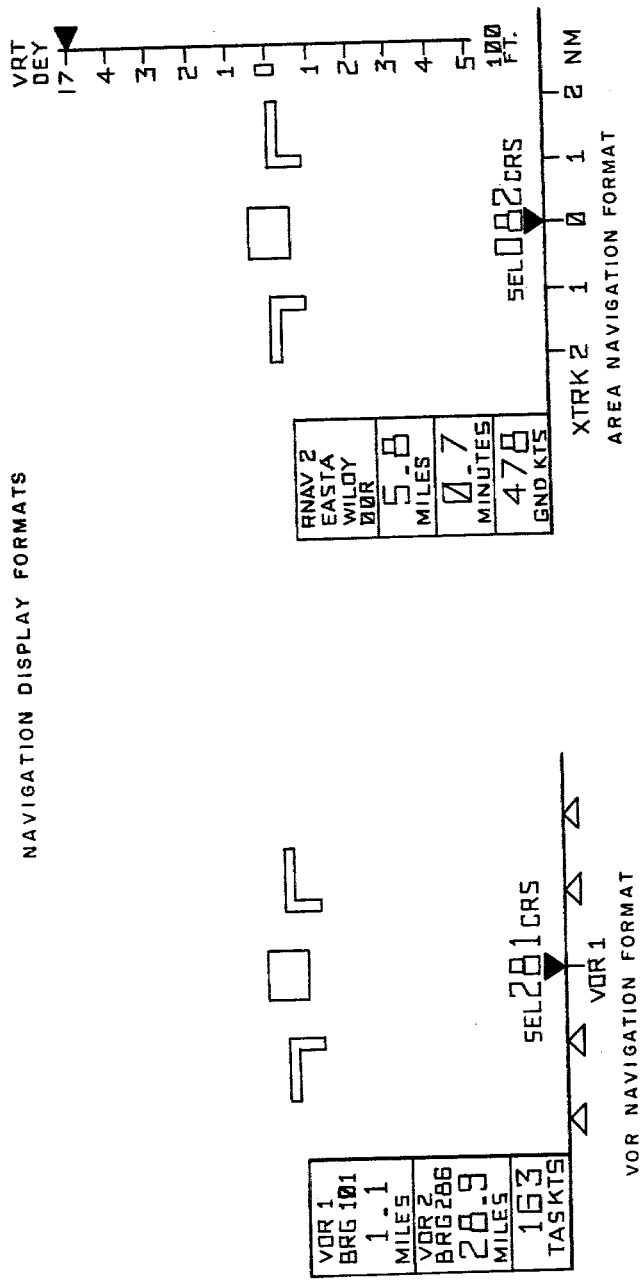

ALTERNATE PITCH SCALE FORMAT

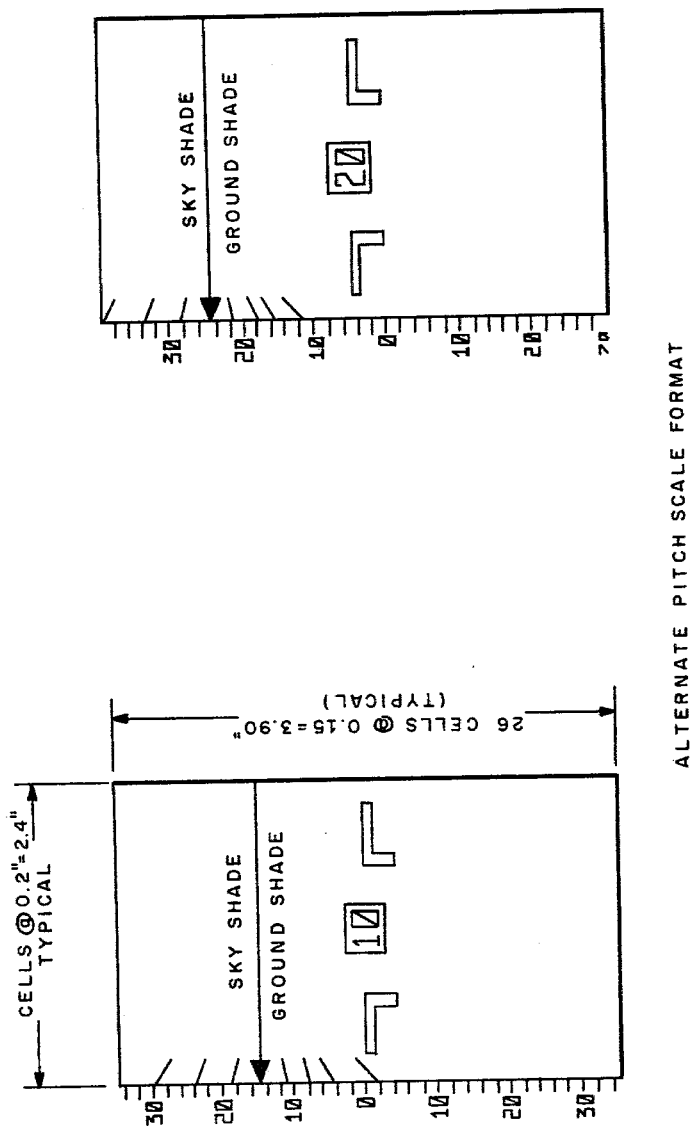

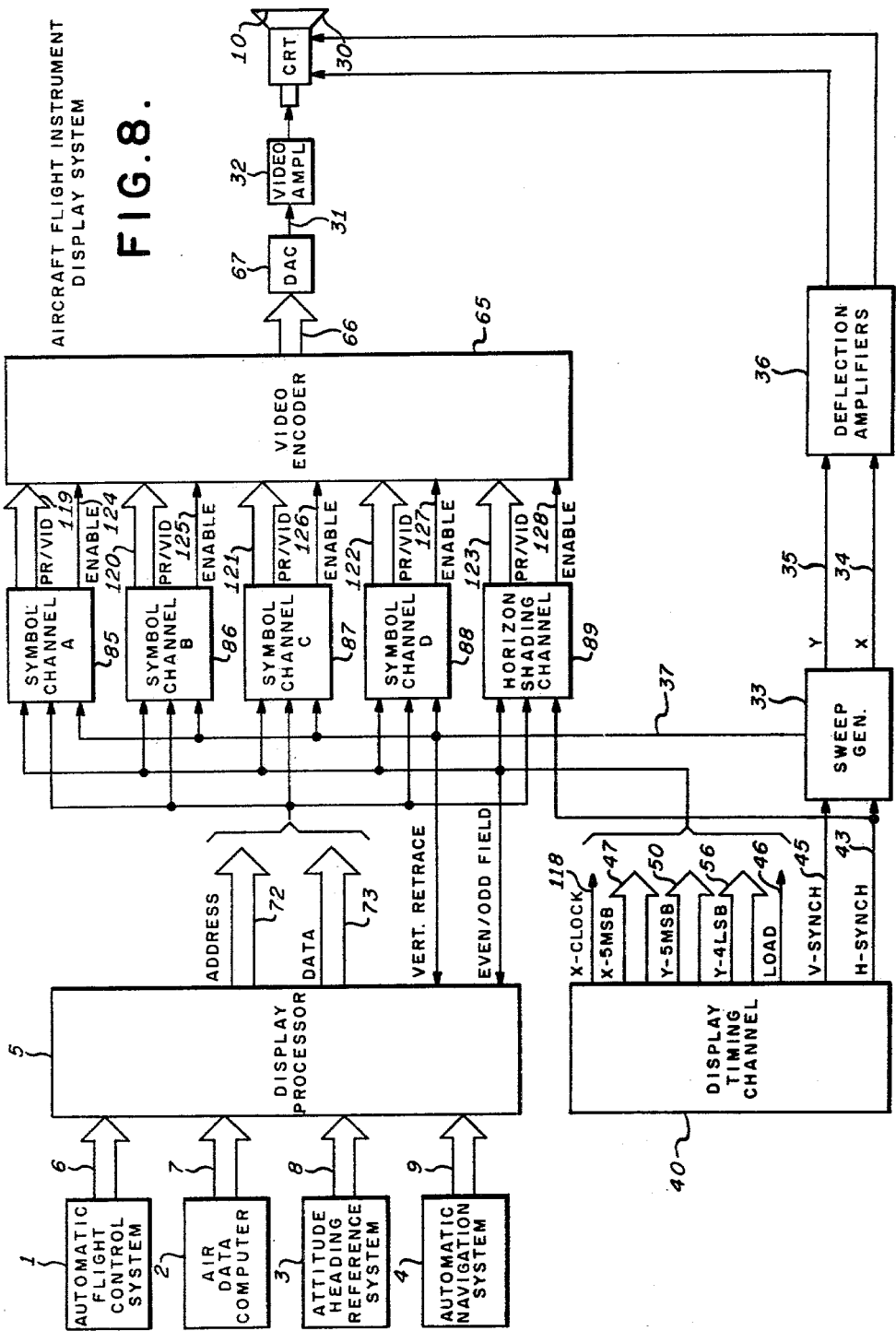

TYPICAL DIGITAL RASTER ALPHA NUMERIC FONTS

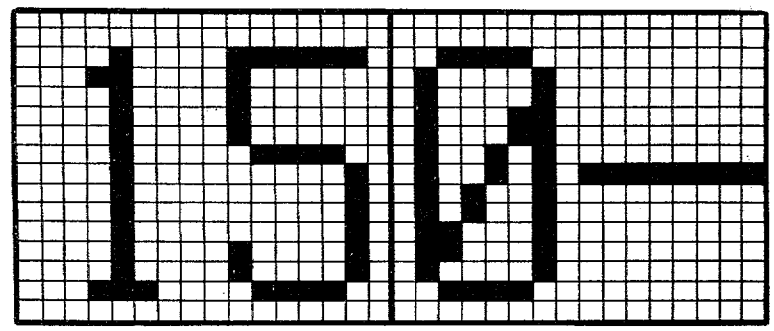
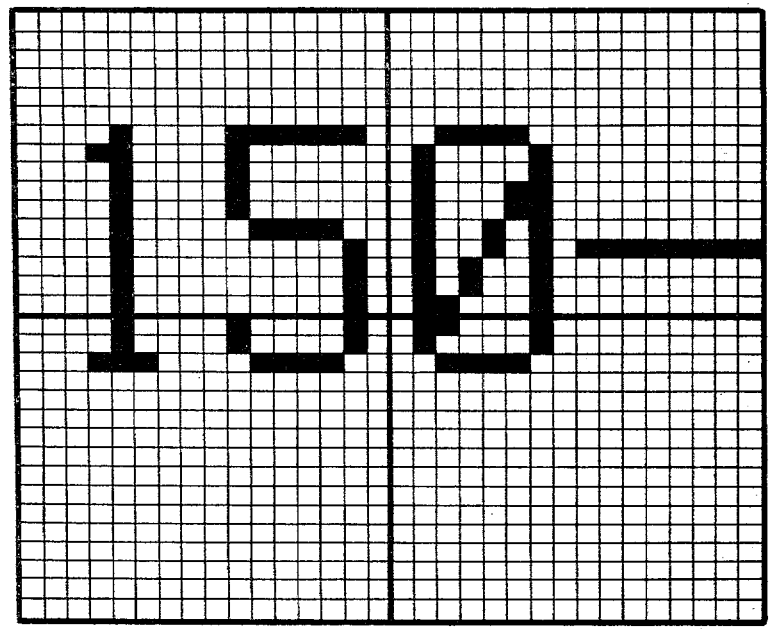
TYPICAL DYNAMIC SYMBOLOGY
FIG.11.

HORIZON SHADING GEOMETRY

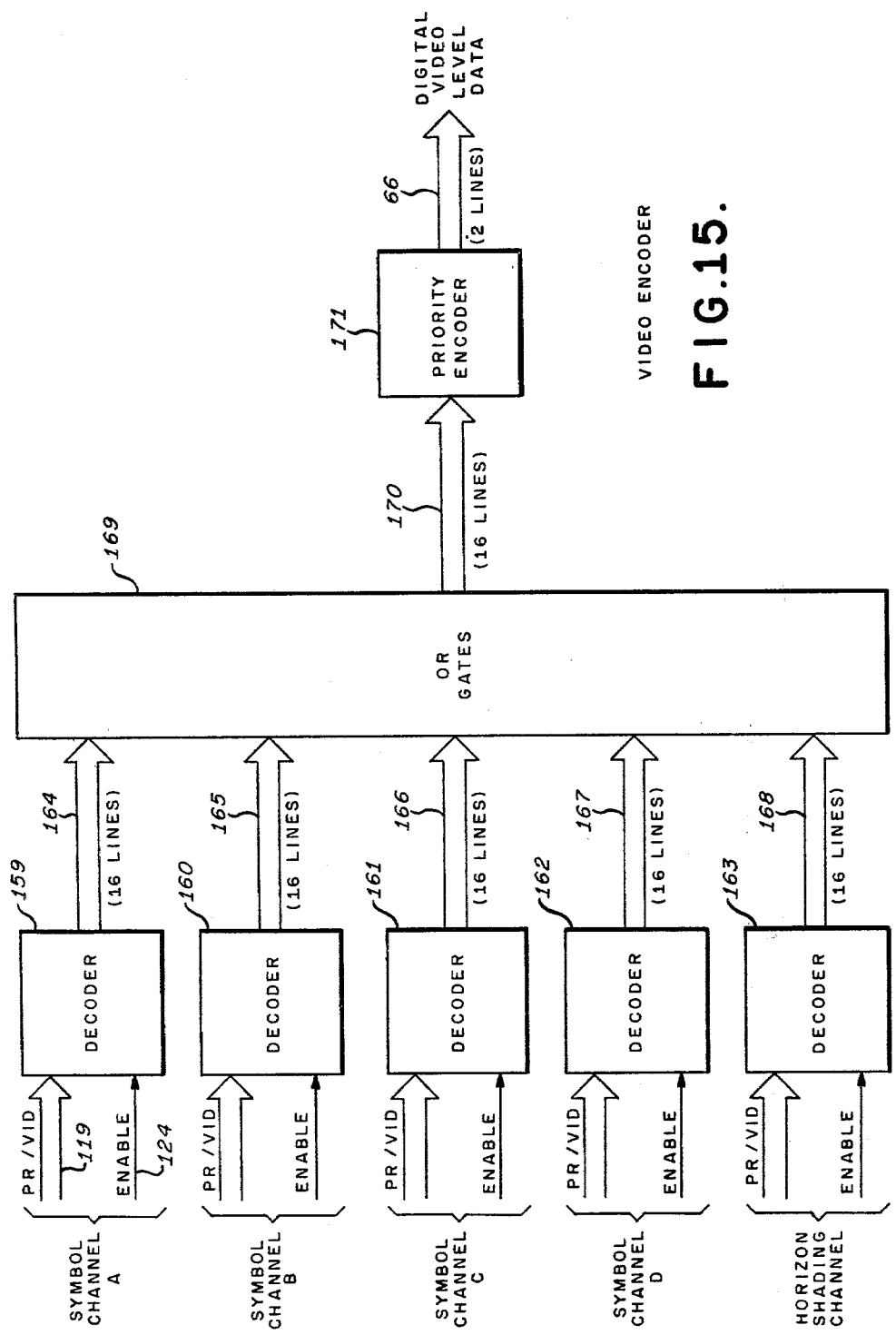

4,247,843

AIRCRAFT FLIGHT INSTRUMENT DISPLAY SYSTEM

This is a division of Application Ser. No. 788,702, now U.S. Pat. No. 4,149,148, filed Apr. 19, 1977.

BACKGROUND OF THE INVENTION

This invention relates, in general, to aircraft flight instrumentation and, more particularly, to apparatus for providing a display of a cluster of instruments that is positioned directly in front of the pilot and which provide him with the primary flight guidance information necessary to control an aircraft through its entire flight regime from takeoff to landing.

The prior art equipment used for primary flight data comprises ten dedicated instruments which are typically spread over a panel area that is approximately 16 inches wide by 13 inches high and requires the pilot to cover a visual scan radius of 10 inches from the center of the attitude-director indicator to cover the multitude of information which is competing for his attention. This wide scan area and excess of extraneous information is particularly distracting during a landing maneuver under low visibility conditions when only a limited number of key parameters are necessary and should be very readily apparent to be effective during this critical maneuver.

The present invention utilizes the digital raster cellular CRT technique disclosed in U.S. Pat. No. 4,070,662, entitled "Digital Raster Display Generator for Moving Displays", invented by P. L. Narveson and assigned to the Sperry Rand Corporation who is also the assignee of the present invention. Said Ser. No. 630,833 issued on Jan. 24, 1978 as U.S. Pat. No. 4,070,662 which is considered incorporated herein by reference. The cell technique disclosed therein enables all the information on the entire cluster of ten electromechanical instruments to be presented in a clear and concise format on a usable CRT screen size that is typically 6.4 inches wide and 4.8 inches high, achieving a scan radius reduction from 10 inches to four inches and a panel area reduction from 130 square inches to 48 square inches. Only that data necessary for a particular phase of the flight mission need be presented with all other information suppressed until required.

The use of the digital raster CRT writing technique is ideally suited to interface with serial digital bus transmission of data which typically requires only a few wires to convey a multitude of information and therefore lends itself to very efficient switching of information from one source to an alternate source should one source of data become invalid.

Another key capability of the digital raster CRT technique is the assignment of priority of symbology to specific areas of the screen. This minimizes any conflict of data presentation and is particularly effective, for instance, in reducing clutter and eliminating parallax of the flight director command cue presentation that is typical of conventional electromechanical attitude director indicators.

Unique circuits that are disclosed herein relate to overlay of sky-ground shading to display an artificial horizon and apparatus to move symbology smoothly from one cell to an adjacent cell in any direction. Additionally the apparatus is configured to provide unique aircraft displays in a manner to be described.

SUMMARY OF THE INVENTION

A CRT display is provided having a display face arranged in an array of major cells, each major cell comprising an array of resolution elements. A map memory containing a map word for each major cell is addressed by digital raster generation circuitry in accordance with the cell upon which the beam is impinging. The map word includes, inter alia, a symbol field and a shift field. A symbol memory storing the symbols to be displayed is addressed by the symbol field of the map word for providing video signals for displaying the addressed symbol in the major cell through which the beam is scanning. Circuitry is included for combining the shift field with the symbol memory addressing signal so as to effect a symbol shift in the Y direction. The shift field is also utilized to effect a shift of the bits from the symbol memory output thereby providing a shift of the symbol in the X direction.

Sky-ground shading is provided by a display channel including a raster line memory having storage locations corresponding to each of the raster lines, each location including a sky-ground shading control field representative of the X dimension at which the corresponding raster line crosses the displayed horizon line. Circuits are included for changing the shading from sky to ground or vice versa in accordance with the information stored in the sky-ground shading control field.

The apparatus of the present invention provides a plurality of unique display formats including a horizon line cooperative with a central reference index and a bank attitude scale having a zero bank angle index laterally displaced from the central reference index and movable vertically as a function of pitch attitude, the spacing of the bank scale markings being varied as a function of craft pitch and roll attitude. The vertical movement of the horizon line and the bank angle scale is further limited for pitch angle greater than a predetermined value and a pitch attitude scale including a zero pitch angle index which is fixed for pitch attitude less than said predetermined value is correspondingly moved for pitch attitude greater than said predetermined value. A unique flight director symbol is also provided and comprises right-left and up-down spaced triangularly shaped arrow heads respectively connected by straight line arrow shaft lines, the spacing between the bases of the arrow heads defining a finite area corresponding to the area of a rectangularly shaped aircraft reference index whereby when the flight director commands are satisfied, the arrow heads project symmetrically beyond said reference index. A further unique display symbology is provided for indicating air speed parameters and comprises a vertical numeric scale movable in accordance with changes in air speed and an air speed reference index representing a predetermined desired air speed which is moved with said air speed scale when the value of the numeric air speed scale corresponds with the reference index. Typically reference air speed indices are provided for desired critical air speeds such as, during take-off, air speed corresponding to decision speed $V_1$, rotation speed $V_R$ and safety speed $V_2$. The movable air speed scale may be obscured until the $V_2$ index corresponds with the $V_2$ speed scale and scale air speeds above $V_2$ will be thereafter displayed.

BRIEF DESCRIPTION OF THE DRAWINGS

FIG. 4 comprising FIGS. 4A-4D are pictorial representations of air speed display formats utilized during take-off and climb of the aircraft;

FIG. 5 comprising FIGS. 5A and 5B are pictorial representations of navigation display formats utilized in the display of the present invention;

FIG. 6 comprising

FIG. 7 comprising FIGS. 7A and 7B are pictorial representations illustrating further alternate pitch scale formats;

FIG. 8 is a schematic block diagram embodying the aircraft flight instrument display system of the present invention;

FIG. 9 also includes a format diagram of the address and data words utilized in the apparatus;

FIG. 11 is a pictorial representation of typical dynamic symbology utilized in the display of the present invention;

FIG. 15 is a schematic block diagram illustrating details of the video encoder of FIG. 8.

DESCRIPTION OF THE PREFERRED EMBODIMENT

Figure 1:
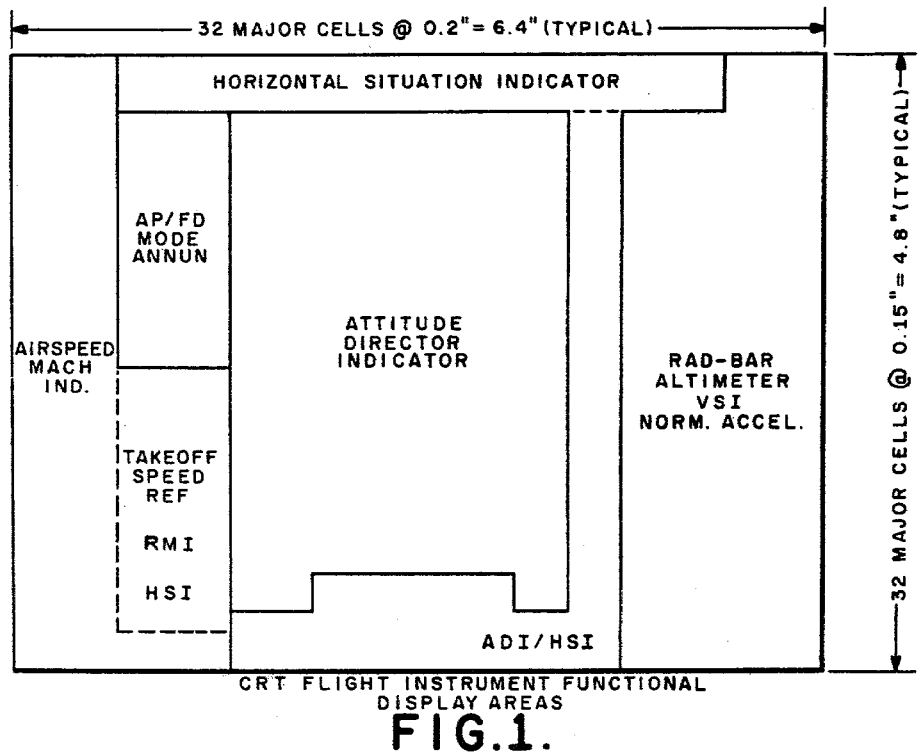
FIG. 1 is a diagram of the functional areas of the integrated CRT flight instrument display of the present invention.

FIG. 1 illustrates how the usable CRT face is divided into functional display areas that contain equivalent information to that provided by typical electromechanical instruments that the single CRT display will replace. The screen is composed of 1024 major cells arranged in an array of 32 cells wide by 32 cells high. Each cell is rectangular in shape with typical dimensions of 0.20 inch wide by 0.15 inch high. The entire usable screen is scanned by a cathode ray which impinges on the light emitting phosphor in a repetitive interlaced manner to form 512 horizontal lines spaced approximately 0.0094 inches apart. The refresh rate of each interlaced frame is typically 100 hertz. The format of the symbology within each cell is generated in four contrasting gradations of light output. For convenience these are designated as black, ground shade, sky shade and bright in this disclosure. The light output within each cell is controlled with a resolution consistent with a 16×16 matrix of picture elements, designated PELS. Each PEL is typically 0.0125 inch wide by 0.0094 inch high and is controlled sequentially by a digital processor to have any of the four available gradations of light output during each sweep of the cathode ray across the screen.

Figure 2:
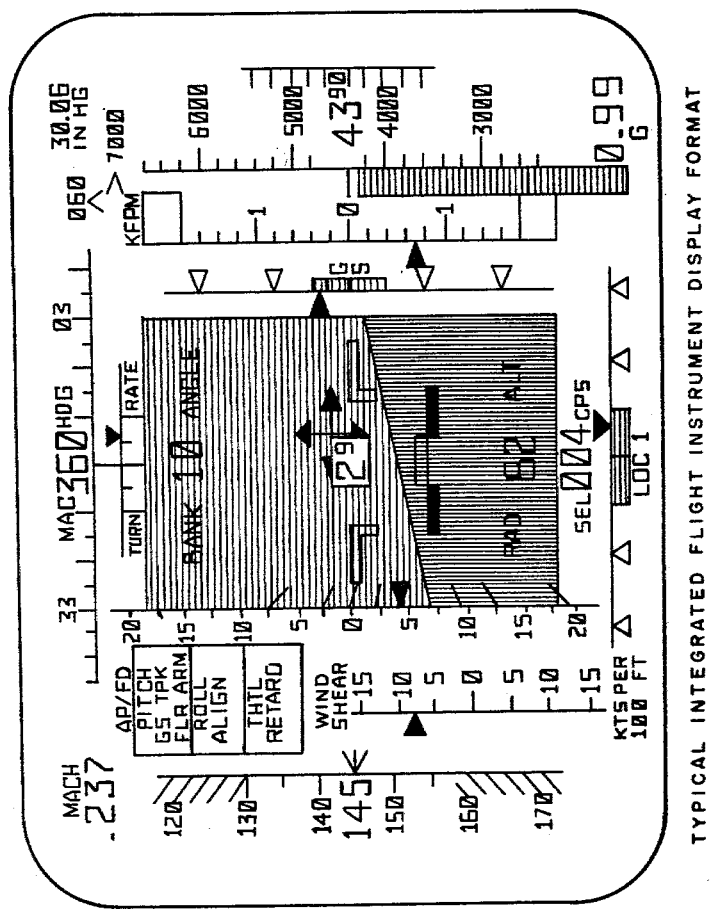
FIG. 2 is a pictorial representation of a typical integrated flight instrument display format.

FIG. 2 is a typical CRT display format that illustrates the capability of the invention. The format shown is particularly applicable to the approach and landing phase. The four gradations of light output are black where there is no shading on the diagram; ground shade where the shading on the diagram is composed of vertical lines; sky shade where the shading on the diagram is composed of horizontal lines. All other symbology is generated in bright shade and is shown as solid black lines on the diagram and thus FIG. 2 may be considered as a photographic negative.

The aircraft reference index at the center of the display field of view has the general shape of an aircraft and comprises a rectangular symbol representing the aircraft nose or fuselage and a pair of laterally extending bars representing its wings. The rectangular symbol is two cells wide by two cells high and has a black interior background with a bright outline. The numeric readout within the rectangle represents the flight path angle of the aircraft $\gamma$ which is the well known aircraft flight parameter defined by the difference between the aricraft's pitch attitude $\theta$ and its angle of attack $\alpha$. The granularity of the flight path angle readout is 0.1 degree for angles between plus and minus 10 degrees and one degree beyond this range. When the granularity is one degree, that is, when flight path angle is ±10° or greater, both numerics are the large size. The large numeric is contained in an area that is 12 PELS wide and 26 PELS high. The small numeric is exactly half the size of the large numeric, contained in an area that is 6 PELS wide and 13 PELS high (for example the numerics of FIG. 10). It will be understood that in some applications it may be desirable to display a numeric readout of pitch attitude rather than flight path angle. The area of the nose symbol has priority over the sky-ground shading and the flight director symbol which will be described in the following paragraph. Thus, the flight director symbol will disappear behind the nose symbol as it moves toward the center of the screen.

Figure 3:
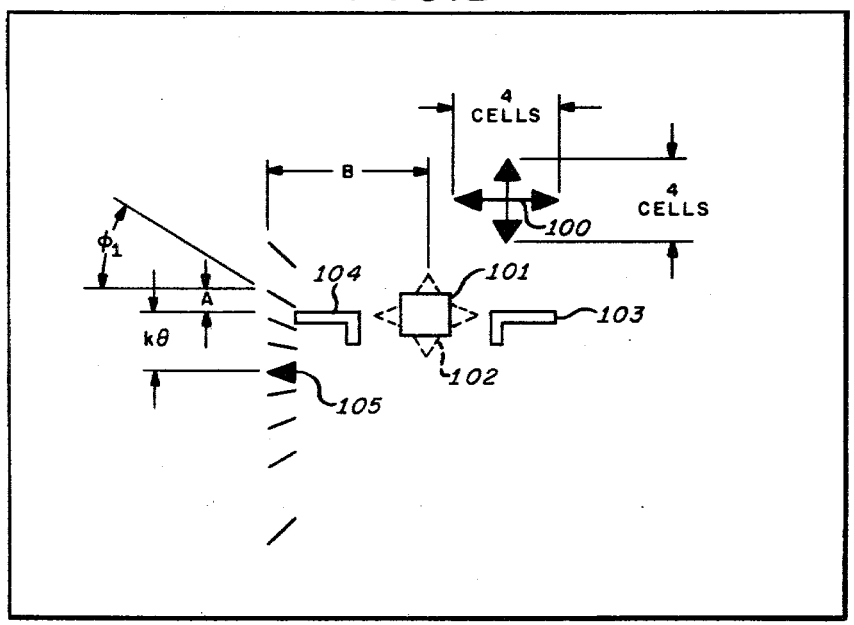
FIG. 3 is a pictorial representation of roll, pitch and flight director symbology of the display of the present invention.

As shown in FIG. 3, the flight director symbol 100 is four cells wide by four cells high. It consists of two crossed lines or arrow shafts which connect four triangles or arrow head. The length of the crossed lines are exactly two cells. The position of the flight director cue 100 relative to the aircraft nose symbol 101 in FIG. 2 is a command to fly up and fly right. The movement of the center of the cue 100 relative to the nose 101 is limited to ±3 cells laterally and ±6 cells vertically. When the commands are satisfied, the crossed lines will be completely obscured by the nose symbol 101 and only the arrows will be in view as indicated at 102. Small deviations in cue movement are very apparent as is indicated in FIG. 2 where one or more of the arrows are partially or completely obscured. Those arrows which are completely in view indicate the direction of the corrective action to be taken to satisfy the commands. It is thus appreciated that the format of the flight director symbol and the priority of the nose symbol result in exceedingly clear and uncluttered presentations of both major and minor control commands or adjustments when they are required.

Referring to FIG. 2, the horizon presentation is shown in an area that is centered about the nose symbol and is 12 cells wide and 22 cells high. The horizon is the boundary between the sky shade (horizontal lines) and the ground shade (vertical lines). The presentation shown in FIG. 2 is 4.2 degrees nose up and 10 degrees right wing down relative to the horizon. A digital readout of roll angle with a one degree granularity is presented at the top center of the horizon display area. A qualitative display of the combined pitch and roll attitude is represented by the relative position of the stationary aircraft symbol (101, 103, 104-FIG. 3) to that of the moving boundary between sky shade and ground shade. A combined analog presentation of pitch and roll attitude is given by the moving array of vertical indices just to the left of the left wing tip 104. When the pitch attitude changes the indices move relative to the adjacent fixed pitch scale which has a range of ±22.5 degrees in the typical format shown in FIG. 2. It should, of course, be understood that the scale factor of the pitch movement is not restricted to that shown in FIG. 2 which is three vertical cells per 5 degrees. The magnitude of the pitch angle can be interpreted by the relative position of the solid triangle 105 of the array of vertical indices against the pitch scale. The triangle 105 also serves as a zero roll attitude pointer for the roll scale extending above and below it.

The horizon shading is limited to a pitch range of plus and minus 17 degrees to ensure that the horizon presentation area is not shown in a single shade. This allows the pilot to always evaluate his relative position with respect to the sky and ground. While the horizon shading is limited, the triangle 105 will always indicate the correct value of pitch through a range of plus or minus 22.5 degrees. Such limiting is accomplished by freezing the pitch digital data from the processor for pitch altitudes greater than ±17°.

The magnitude of the roll angle can be interpolated by the position of the horizon line relative to the four inclined indices above and below the triangle 105. The indices or roll graduation marks represent 10, 20, 30 and 45 degree bank angle references, respectively, and are inclined to the top of the fixed airplane symbol accordingly. The inclination of each graduation is constant while the array moves vertically as a function of pitch attitude. The spacing between the indices, however, varies as a function of pitch attitude in accordance with the relationship as indicated on FIG. 3. The value of B or lateral displacement between the reference airplane and roll scale in FIG. 3 is typically 6 cells. The unique array of the indices allows the pitch and roll angle of the aircraft to be determined by the pilot in a very natural manner within a very small scan area.

A digital readout of radio altitude is presented at the bottom center of the horizon area. It has a range of 3000 feet above the terrain and will disappear for values greater than 3000 feet. The granularity of the readout is one foot between zero and 100 feet, ten feet between 100 and 400 feet and 100 feet above 400 feet. An analog presentation of radio altitude is available when the value is less than 200 feet. It appears as two segmented horizontal bars which rise to meet the bottom of the fixed airplane symbols 103 and 104 as the altitude above the terrain decreases to zero with the zero value indicated when the bars contact the bottom of the airplane symbol. The internal area of the bars will flash when radio altitude is less than 100 feet, thus acting as an alert signal to the pilot. A third bar is positioned between the radio altimeter bars with its position with respect to the bottom of the nose symbol 101 representing the rate of change of radio altitude. The scale factor of the radio rate display is such that a continuous alignment of the radio displacement bars with that of the radio rate symbol after an initial alignment will result in an exponential flare maneuver which will have a typical touchdown rate of descent of between two to four feet per second.

The scale to the lower left of the pitch scale is used to display wind shear in knots per 100 feet. It is derived by using the wind data generated by the automatic navigation system, subtracting the tower-reported wind at the runway and dividing by the altitude derived from the radio altimeter.

As indicated in FIG. 1, the area at the extreme left of the screen is dedicated to the airspeed-Mach indicator functions. The top portion of the area is used for a digital readout of Mach number. It occupies an area that is four cells wide by three cells high. The format of the remainder of the airspeed display varies with the mode of operation. The modes are takeoff, climb and cruise, approach and landing. The format shown in FIG. 2 is typical of the approach and landing mode. FIG. 4 illustrates the progress of the airspeed formats during takeoff and climb. FIG. 4A shows a typical situation during the ground roll prior to attainment of decision speed $V_1$. In the specific case shown a total of seven reference speeds are displayed. These correspond to decision speed $V_1$ (135 knots), $V_R$ (rotation speed-140 knots), $V_2$ (take-off safety speed - 150 knots), flap retraction speed ($V_3$ - 195 knots), climb speed below 10,000 feet ($V_4$ - 250 knots), optimum climb speed above 10,000 feet ($V_5$ - 310 knots) and a Mach reference speed ($V_M$ corresponding to M=0.820).

The large numerics at the left center of the screen represent the existing airspeed of the aircraft in knots. The numerics occupy a space that is three cells wide and two cells high and have the highest priority; that is, no other symbology can intrude into the space. In FIG. 4A, the space with the diagonal lines normally is used to display a moving airspeed scale at a typical gradient of four vertical cells per 10 knots. The diagonal lines serve to effectively obscure the airspeed scale and are used to indicate that the aircraft has not attained take-off safety speed, $V_2$. As the aircraft gathers speed, the $V_1$, $V_R$ and $V_2$ symbols will start to move upward from the positions shown in FIG. 4A when the scale is aligned with the respective symbol values. The condition shown in FIG. 4A is one where the $V_1$ symbol is exactly aligned with a scale value of 135 knots and will begin to move upward as the aircraft increases its speed above 115 knots.

The situation shown in FIG. 4B illustrates the condition where the aircraft's speed is ten knots above take-off safety speed. The scale obscuration is removed and the scale is accordingly revealed for values greater than 150 knots. The scale symbology is suppressed in the area of the large numeric readout. In a dynamic situation the illusion is one where the airspeed scale appears to go behind the large numerics as it moves past the high priority area.

The reference airspeed values shown at the bottom of FIG. 4B will remain fixed until the bottom of the airspeed scale coincides with the specific value of the reference that is closest to the scale, at which time the reference values will index upward in the manner shown in FIG. 4C where the 250 knot reference (V4) is adjacent to the actual airspeed value. The reference airspeed identified with the letter M represents the airspeed that corresponds to the reference Mach number (0.820 in the typical case shown) at the existing altitude of the aircraft. The typical data shown in FIG. 4C is consistent with an existing pressure altitude of 5000 feet. The typical data shown in FIG. 4D is consistent with a pressure altitude of 22,400 feet. The airspeed reference values shown at the top of the airspeed scale in FIGS. 4C and 4D are beyond the range of the display and remain fixed in a manner similar to the references shown at the bottom of FIGS. 4A and 4B. The area with the diagonal lines in FIG. 4D represents airspeed values that are greater than the maximum operating airspeed $V_{mo}$ (375 knots in the typical case shown). It is thus seen that the take-off climb airspeed display with its diagonal lines portrays the safe airspeed range which is between $V_2$ and $V_{mo}$. In general $V_{mo}$ is a function of altitude for a specific aircraft. The take-off safety airspeed $V_2$ is typically a function of aircraft gross weight, flap/slat position, runway altitude and outside air temperature. The areas in FIG. 2 with the partial diagonal lines represent less than stall margin speed at the upper portion of the airspeed scale and greater than flap placard speed at the lower portion of the airspeed scale. The stall margin speed of the aircraft is typically a function of gross weight and flap/slat position. As indicated in typical FIG. 2, the actual speed of the aircraft is shown to be approximately midway between the flap placard speed and the stall margin speed.

The altitude display on the extreme right of FIG. 2 is arranged similar to that for airspeed. The space at the right center of the screen has maximum priority and is used for a digital readout of pressure altitude with a granularity of ten feet when vertical speed is less than 2000 feet per minute and 100 feet when vertical speed is greater than 2000 feet per minute. The space for the large numerics is three cells wide and two cells high. The large numerics represent flight level; that is, pressure altitude in 100 feet increments. The small numerics represent altitude increments of ten feet. The space above and below the numeric readout area is used to portray a moving altitude scale at a typical gradient of five vertical cells per 1000 feet. The altitude scale increases from bottom to top while the airspeed scale increases from top to bottom. This arrangement results in both scales moving in the same direction for a nose up maneuver. That is, a nose up maneuver generally will result in a decrease in airspeed and an increase in altitude. The series of short horizontal lines at the extreme right are spaced one cell apart in a vertical direction and represent altitude increments of 32 feet. Changes in altitude will result in a movement of the lines in a direction consistent with the change in altitude. That is, an increase in altitude will result in an upward movement of the short lines and vice versa. This will result in a sensitive and dynamic indication of vertical speed. It should be noted that movement of the altitude scale will be much slower and also will be in a direction opposite to that of the short lines. The readout at the top right of FIG. 2 represents the barometric correction required to align the pressure altitude scale and readout to be consistent with the local elevation with respect to mean sea level. The symbol just below the baro-set readout represents a selected altitude value which operates similar to the airspeed references previously described.

The sky shade area just to the left of the altitude scale and below the center represents a coarse analog presentation of altitude above the terrain as sensed by a radio altimeter. It is a bar thermometer type display which has the same gradient as the pressure altitude scale; that is, five vertical cells per 1000 feet. The gap between the center line and the bar represents altitude above the terrain and is consistent with the digital readout at the bottom center of the horizon display area. A unique feature of the radio altitude bar presentation adjacent to the pressure altitude scale is that relative motion between the top of the bar and the scale reflects either a rising or descending terrain. If the top of the bar moves down slower than the altitude scale, the terrain is rising; if the top of the bar remains aligned with the scale, the terrain is level; if the top of the bar moves down faster than the scale, the terrain is descending. The bar display will disappear when altitude above the terrain exceeds 3000 feet.

The vertical display format just to the left of the altitude presentation is used to portray vertical speed at a gradient of five vertical cells per 1000 feet per minute. The solid triangle moves along the fixed scale when vertical speeds are less than ±2000 feet per minute. The typical format shown in FIG. 2 represents a rate of descent of 700 feet per minute. A vertical rate of climb greater than 2000 feet per minute results in the solid triangle being positioned adjacent to the top box under the legend "KFPM". The value of rate of climb is displayed as a digital readout with a granularity of 100 feet per minute between 2000 and 10,000 feet per minute and 1000 feet per minute for vertical speeds greater than 10,000 feet per minute. A similar display is used for rates of descent with the solid triangle adjacent to the box at the bottom of the scale. The digital readout consists of a large numeric to represent 1000 feet per minute increments and a small numeric to represent 100 feet per minute increments. In order to provide the pilot with a sensory indication of craft vertical movement, especially when the vertical speed pointer is at one of its maximum positions, a series of space graduations is provided adjacent the vertical speed scale; and these graduations are moved in directions corresponding to the movement of the vertical speed pointer. This is especially useful in distinguishing vertical speed information from the motion of the altitude scale.

The vertical display format just to the right of horizon display area represents glide slope deviation. The sky shade area to the left of the legend "GS" represents the acceptable glide slope deviation at 100 feet above the runway. The solid bright triangle moves relative to the fixed scale. The pair of open triangles on either side of the null of the fixed scale represent deviations of 75 millivolts and 150 millivolts respectively. When the solid triangle is above the null, it represents a condition where the aircraft is below the center of the glide slope beam. The horizontal display at the bottom center of the screen represents localizer deviation in a manner similar to the glide slope display except that the sky shade area is expanded to have three times the sensitivity of the scale outside the sky shade area. The numeric readout above the localizer display represents the course of the particular localizer beam that the aircraft is following.

The heading display at the top of the screen comprises a large three digit numeric readout of aircraft heading with a granularity of one degree. The area of the numeric readout and adjacent legend "MAG HDG" has the highest priority similar to the airspeed and altitude readouts. The areas on either side of the numeric readout are used to display a moving scale of heading. When applicable an open triangle will move with the heading scale to represent selected heading references. The references will park themselves to the right or left of the moving scale if the selected value is beyond the range of the scale that is in view. This is similar to the formats used for airspeed and altitude references previously discussed. The area directly under the heading display is used to portray rate of turn as indicated in FIG. 2.

The autopilot-flight director mode annunciator is shown in FIG. 2 in the area designated in FIG. 1. Separate areas are used to annunciate pitch, roll and throttle modes. Each area has capability to display three line legends with each line having up to seven characters.

FIG. 5 illustrates two additional formats that are used to display navigation data. FIG. 5A represents status of aircraft position with respect to two VOR stations. The deviation from the VOR beam that has been selected for tracking is shown by the position of the bright triangle with respect to the horizontal line at the bottom of the screen. The open triangles represent 75 and 150 millivolt deviations from the selected course which is typically shown as 281 degrees in FIG. 5A. The data in the three boxes at the left represent bearings and distances to each of two VOR stations and also the true airspeed of the aircraft.

FIG. 5B represents status of aircraft position with respect to a second type of navigation system such as inertial or area. The presentation is similar except that cross track deviation is shown in nautical miles rather than millivolts of beam deviation. The data at the left is consistent with the characteristics of the particular navigation system. The typical example shown reflects area navigation between two way points (identified as EASTA and WILDY). The distance to the next way point is 5.8 nautical miles with an elapsed time to go of 0.7 minutes, based on a ground speed of 478 knots.

Referring back to FIG. 2, the large numerics at the bottom right of the display represents a digital readout of the normal acceleration of the aircraft expressed in units of earth gravity.

Figures 6A, 6B, 6C:
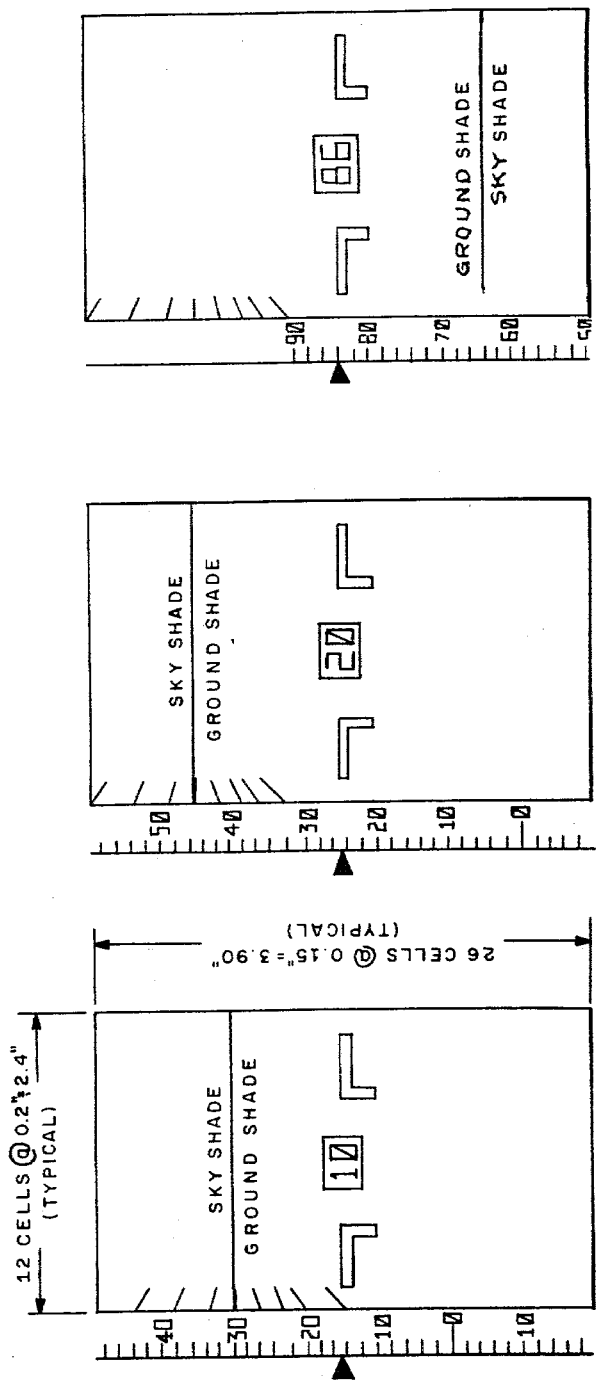
FIGS. 6A-6C are pictorial representations illustrating alternate pitch scale formats utilized in the display of the present invention.

An alternate pitch scale presentation is shown in FIG. 6. In this format the horizon area is expanded to be 26 cells high and the pitch scale is reduced to 8 degrees per three vertical cells. The pitch index is stationary and is located to the left of the pitch scale which moves relative to the index when pitch attitude of the aircraft changes. The indicia of the scale moves downward for pitch attitude changes in a nose up direction and vice versa. The roll indices are similar to those shown in FIG. 3 except that the zero roll index is a straight line rather than the triangle 105. The movement of the horizon line is limited to ±20 degrees in order to obtain a presentation of contrasting sky-ground for all combinations of pitch and roll attitudes. This is shown in FIG. 6B. The movement of the pitch scale is continuous and its reading is made with respect to the fixed pitch index. The scale is limited to ±90 degrees. If the aircraft maneuvers through 90 degrees, the sky-ground shading will revert to that shown in FIG. 6C where the aircraft has maneuvered past 90 degrees and is starting to fly on its back. The movement of the pitch scale will reverse when the aircraft has maneuvered past ±90 degrees of pitch attitude.

A second alternate pitch scale presentation is shown in FIG. 7. In this format the horizon area is also expanded to be 26 cells high and the pitch scale is reduced to 8 degrees per three vertical cells. The array of vertical indices previously discussed with reference to FIG. 3 moves for a pitch range of ±20 degrees against a fixed pitch scale. When the pitch angle is greater than 20 degrees, the indices will remain stationary at the 20 degrees pitch position and the pitch scale will move to correspond. This is illustrated by comparing FIG. 7A with FIG. 7B. In FIG. 7A, the pitch attitude is 15 degrees nose down while in FIG. 7B the pitch attitude is 25 degrees nose down, the craft flight path angle being −10° and −20° respectively. It should be noted that when the aircraft moves pitch down between 20 and 25 degrees the pitch scale moves downward to correspond with the fixed pitch index. The limit of the movement of the array of vertical indices results in a presentation of contrasting sky-ground shading for all combinations of pitch and roll attitudes.

FIG. 8 is a block diagram of the preferred embodiment of the aircraft flight instrument display system where many of the reference numerals indicate like components with respect to similarly designated elements of said SN630,833. The aircraft parameters, as discussed above, to be displayed are generated by well known onboard aircraft systems comprising an automatic flight control system 1, an air data computer 2, an attitude-heading reference system 3 and an automatic navigation system 4. The data is transmitted to display processor 5 via digital data buses 6, 7, 8 and 9. The buses are typically arranged to transmit 32 bit words in serial format at a bit rate of 100,000 per second.

The flight control information transmitted over data bus 6 includes pitch, roll and throttle control modes of operation, flight director fly-up/fly-down commands, radio altitude, glide slope deviation, localizer deviation, air-speed references and altitude references. The air data information transmitted over data bus 7 includes barometer setting, pressure altitude, calibrated airspeed, Mach number, true airspeed, vertical speed and maximum operating speed. The inertial information transmitted over data bus 8 consists of pitch attitude, roll attitude, magnetic heading, true heading, rate of turn, lateral acceleration, normal acceleration and longitudinal acceleration. The navigation information transmitted over data bus 9 includes VOR deviation, VOR distance, VOR bearing, selected course, selected heading, cross track deviation, vertical track deviation, way point identification, distance to way point, time to way point and ground speed.

The apparatus of FIG. 8 is a simplified illustration of the symbol generator disclosed in more detail in said Ser. No. 630,833. The apparatus of FIG. 8 includes a conventional cathode ray display tube 30, on the face 10 of which the formats illustrated in FIGS. 1 through 7 are displayed. The video input to the cathode ray tube 30 is provided on a lead 31 via a conventional video amplifier 32. The X (horizontal) and Y (vertical) sweeps for the raster of the cathode ray tube 30 are provided by a conventional sweep generator 33 via respective leads 34 and 35 and conventional deflection amplifiers 36. The sweep generator 33 may be comprised of the usual saw tooth wave form X and Y sweep generators for providing the conventional linear raster. The sweep generator 33 also provides a vertical blanking pulse on a lead 37 which is generated in a well known manner and coincides with the vertical flyback of the beam of the CRT 30 between frames.

The raster is synchronized by horizontal and vertical sync pulses from a digital timing circuit 40. The timing circuit 40, as indicated in detail in said Ser. No. 630,833 includes a conventional clock pulse oscillator and conventional 9-stage X and Y counters. Since the X counter is comprised of 9 stages, an overflow output is provided on a lead 43 after the counter accumulates 512 X-clock pulses. The overflow output from the X-counter appears on lead 43 and provides the horizontal sync pulse to the sweep generator 33. The X-counter overflow is also applied as the input to a 9-stage Y-counter. The Y-counter is configured similar to the X-counter and accumulates 512 of the overflow pulses from the X-counter before it, in turn, provides an overflow signal on a lead 45. The overflow signal from the Y-counter is applied as the vertical sync pulse to the sweep generator 33.

Since the generation of the X and Y raster sweeps from the sweep generator 33 are synchronized via the horizontal and vertical sync pulses from the X and Y counters, the digital outputs from the counters respectively correspond to the X–Y position of the beam of the cathode ray tube 30. As discussed previously with respect to FIG. 1 and in said Ser. No. 630,833, the face 10 of the display screen is considered as divided into a 32 by 32 matrix of cells, each cell comprising a 16 by 16 matrix of resolution elements. Thus, the face 10 of the display screen may be considered as comprised of a 512 by 512 matrix of resolution elements. Since the X and Y counters each have a capacity of 512 counts, the instantaneous binary numbers in the counters provide the X and Y coordinates of the resolution element of the display screen on which the beam is about to impinge.

The X-counter also provides a "LOAD" pulse on lead 46 that occurs in response to every 16 pulses applied to the X-counter from the clock pulse oscillator.

The lead 46 is coupled to the fourth least significant stage of the X-counter and provides a signal which occurs just prior to the entry of the CRT beam into an adjacent display cell as the beam is swept across the screen in raster fashion.

As described in said Ser. No. 630,833, the five most significant bits from the X-counter in timing circuit 40 are provided on a cable 47 and the five most significant bits from the Y-counter in the timing circuit 40 are provided on a cable 50. It will be appreciated from the previous discussion, that as the beam of the cathode ray tube 30 is swept in its raster pattern, the counts in the 5 most significant stages of the X and Y counters remain constant while the beam is within a particular cell and changes count as the beam transitions to the next cell. Thus, each of the cells on the display face 10 has a unique 5-bit binary X and Y address associated with it corresponding to the respective counts of the five most significant stages of the X and Y counters. These 5 bit X and Y digital signals on the cables 47 and 50 provide an address for the 16-bit storage locations corresponding to the 1024 cells.

The four least significant bits from the four least significant stages of the Y-counter in timing circuit 40 are provided on a cable 56. Since the input to the Y-counter is provided by the over-flow signal from the X-counter, the Y counter advances one count as the beam of the cathode ray tube 30 advances vertically by one raster line. Thus the four least significant stages of the Y counter cycle through a complete count for every 16 raster lines that the beam advances in the vertical direction, consequently providing a unique digital address signal for each raster line in each group of 16 lines. Therefore, the four least significant bits on the cable 56 provides a unique address for each row of resolution elements for each matrix of resolution elements within each of the display cells of the display face 10.

The display processor 5 is organized to command video modulation at a rate of 100 fields per second where a field is 256 raster lines with a resolution of 512 segments per line. A rate of 100 fields per second is required in order to obtain a high quality, flicker-free presentation on the CRT face. Interlaced fields of 256 lines alternate every 10 milliseconds to form a complete display format on the face of the CRT at a frame rate of 50 hertz. The timing channel 40 determines the field rate by utilizing approximately 8 milliseconds for sweeping the cathode ray beam across the CRT face to generate the even field of 256 raster lines. It utilizes approximately 2 milliseconds for vertical retrace of the beam followed by 8 milliseconds to generate the odd field of 256 raster lines. The identification of the even-odd raster fields is determined by the least significant bit on cable 56. The even-odd fields are generated conventionally whereby the first line of the raster is started at the top center of the screen and is initiated at the end of a vertical retrace pulse. The odd field ends at the extreme right end of the next to last raster line. The vertical retrace sweep will start the even field at the extreme left of the second raster line and end at the middle of the last raster line at the bottom of the screen. The vertical retrace time interval is indicated when a vertical blanking pulse appears on line 37 from sweep generator 33, which pulse is used by the display processor to respond to data inputs on buses 6, 7, 8 and 9 and provide data outputs on buses 72 and 73 to the symbol channels 85, 86, 87 and 88.

Figure 9:
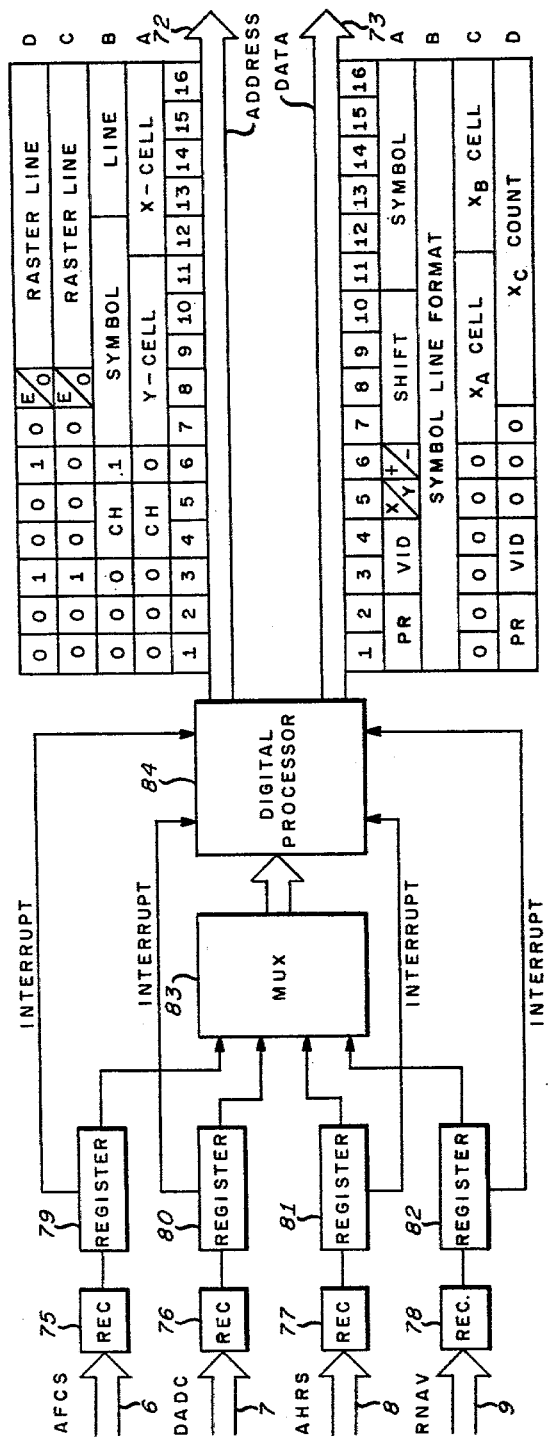
FIG. 9 is a schematic block diagram illustrating details of the display processor of FIG. 8.

The display processor and its output word formats are shown in FIG. 9. Conventional data bus receivers 75, 76, 77 and 78 in conjunction with registers 79, 80, 81 and 82 store data from the AFCS, DADC, AHRS and RNAV as transmitted on buses 6, 7, 8 and 9 respectively. The aircraft systems have been previously identified as 1, 2, 3 and 4 in FIG. 8. The data in the registers enter the digital processor 84 through multiplexer 83 when interrupt signals from a register indicates that it has been filled. It will be appreciated that the serial words from the aircraft systems 1 through 4 can be entered into the digital processor at a significantly reduced rate than the 100 per second field rate of the CRT display system. For example, it is quite satisfactory to update aircraft system data into the digital processor 10 times per second. This means that the digital processor need only handle one tenth the entire information content of the display format during each vertical retrace interval. Referring to FIGS. 1 and 2, the division of information to be used for a specific retrace interval could typically be related to ten groups of cells which are associated with specific functional areas such as airspeed-Mach, pitch-roll attitude, heading-turn rate, altitude-vertical speed-normal acceleration, AP/FD mode annunciation, take-off speed references-RMI, glide-slope-localizer-vertical deviation-NAV deviation, radio altitude, flight director. Other information and time divisions, of course, can be programmed as required for efficient utilization of the data and to obtain good quality displays under dynamic conditions.

Figure 10:
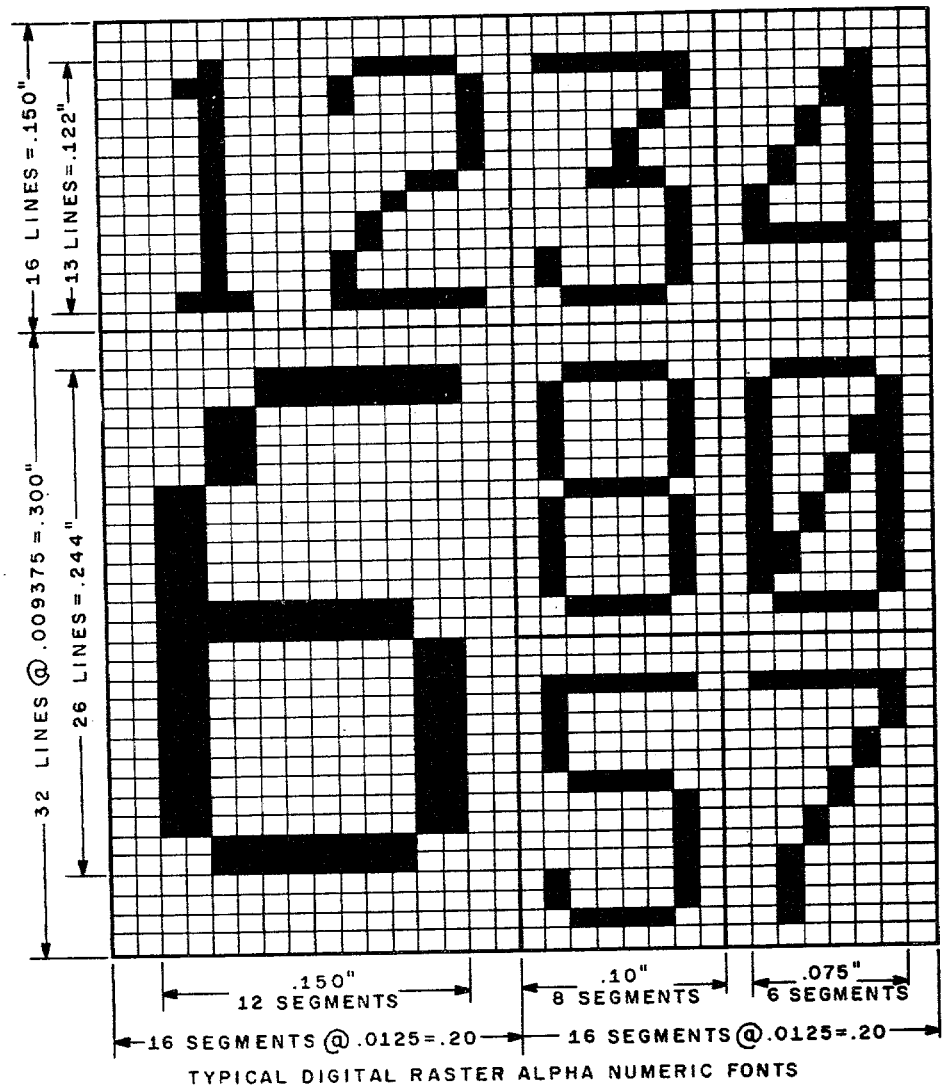
FIG. 10 is a pictorial representation of typical digital raster alphanumeric fonts.

Buses 72 and 73 are used to format the contents of the 1024 cells that define the field of view on the face of the CRT 10. The display processor has access to pre-programmed symbols which are used identically or partially in various cell locations. These are typically numeric fonts of a type shown in FIG. 10. Alphabet fonts, triangles, vertical lines, horizontal lines, scale tick marks, etc. are also available from conventional memory devices such as ROM, PROM, magnetic disc, etc. The small numeric fonts of FIG. 10 are generated within a matrix of six segments wide by 13 lines high. Two horizontally adjacent small alpha-numerics can thus be accommodated within a cell which is 16 segments wide and 16 lines high. The large numeric is 12 segments wide by 26 lines high and can be accommodated within two major vertical cells. The use of these symbols is illustrated in the typical display format of FIG. 2. The display processor also has the capability to generate and load into the symbol memory banks special digital raster formats such as the symbology shown in FIG. 3. It will be noted that each cell and each PEL has the same height and width proportion as the field of view of FIG. 1, i.e. it is not square but rectangular in shape. Thus, the displayed alpha-numerics are inherently esthetically appealing.

The dynamic use of the four symbol channels is illustrated by considering a specific example such as the moving airspeed scale at the extreme left of FIG. 2. The specific symbology that will be used as an example is that part of the scale which represents 150 knots as indicated in FIG. 11.

According to the present invention, the symbols may be moved from cell to cell smoothly; that is, a symbol may occupy positions in which they overlap adjacent cells. For example, the top part of the FIG. 11 shows the symbology in a nominal position with respect to the two adjacent cells which the symbology occupies. The bottom portion of FIG. 11 shows the symbology after it has moved vertically to a position where the symbology is split and occupies a total of four cells. The numerics "1" and "0" occupy the left halves of two cells respectively. The numeric "5" and the major scale tick mark occupy the right halves of two cells respectively. The numerics "1" and "0" are assigned to symbol channel A while the numeric "5" and the major scale tick mark are assigned to symbol channel B. The scheme used to move the symbol vertically to a new set of cells is to assign the same symbology to two adjacent cells and shift the line by line format by an appropriate number of lines. In the example shown in FIG. 11, symbology in the upper pair of cells is shifted downward from nominal by 4 raster lines while the identical symbology in the lower pair of cells is shifted upward by 12 raster lines. Where symbology is to be shifted horizontally, as for the heading scale of FIG. 2, the technique is similar except that the shifts are in PEL segments rather than raster lines. The large numerics such as used for digital readouts of airspeed, flight level, flight path angle, roll attitude, radio altitude, Mach number, heading, selected course, normal acceleration, true airspeed, ground speed distance to waypoint and time to waypoint are assigned to channel C. The formats for these numerics, occupy two adjacent vertical cells and require definition of fragmented numerics between the adjacent cells in order to form a complete numeric. The large numerics can be shifted horizontally or vertically by considering the fragmented numeric as a complete symbol that occupies one cell and operating in a similar manner to that used for the small size alpha-numerics.

Each symbol channel is associated with a memory bank which has 2048 positions where 16 bit words can be written during a vertical retrace interval. Half of the memory bank positions correspond with the 1024 cells of the display format and is designated the map portion of the memory bank. The remaining half of the memory bank is designated the symbol portion of the memory bank and has sufficient capacity to store 64 different symbols, each of which is defined by sixteen 16 bit words that are also written during a vertical retrace interval. As discussed previously, only a relatively small portion of the memory bank need be addressed during any given vertical retrace interval.

For example, consider that the cells of the airspeed-Mach area of FIG. 4 will be addressed during a specific vertical retrace interval in order to update that part of the display compared to the situation that was in effect 0.1 second prior. To do this the processor need only address the 32 cells of each of the first four cell columns for a total of 108 cells. The Mach information consists of alpha-numerics of two sizes displayed in bright shade. It occupies 12 cells and has top priority; that is, no other data can override the data in those cells. The large numeric airspeed readout at the left center occupies 6 cells and also is displayed with top priority in a bright shade. The three columns of 22 cells each above and below the airspeed readout area are used to display a moving scale similar to the moving tape of an electromechanical type instrument. It is displayed in bright shade but has the lowest of four available priority levels in order that the tape not intrude on the airspeed readout area. The diagonal lines have a priority that is one level higher than that of the tape. The five lines of four cells below the airspeed tape and the two lines of four cells above the airspeed tape have top priority. The moving triangles in the 22 cells of the fourth column have a priority that is one level less than the top value.

An examination of FIG. 4 indicates that the entire range of airspeed-Mach symbology shown in FIG. 4 can be generated with ten small numeric symbols, four small alphabet symbols, a full cell width scale tick mark, a half cell width scale tick mark, two diagonal lines, a full cell width triangle, a half cell notch symbol, ten large numerics, a decimal point and a full cell length line for a total of 42 different symbol formats that each can be generated within a 16 segment by 16 line matrix. A further examination of the remaining display formats that are shown in FIGS. 2, 3, 5 and 6 reveals that practically all of the airspeed-Mach cell symbology is repeated identically for the other formats and that it is only necessary to add the remaining 21 small numeric alphabet fonts and some special symbology such as that of FIG. 3 to generate the entire integrated flight instrument display except for the background shading. A separate horizon shading channel 89 of FIG. 8 is used to generate that portion of the display format as will be described later.

The output of the digital processor 84 of FIG. 9 consists of an address bus 72 and a data bus 73 on which 16 bit data words are transmitted. The address and data words are synchronized; that is, an "A" address is associated with an "A" data word, etc. Address words are of three types: map, symbol and background shading. Map and symbol addresses are associated with symbol channels 85, 86, 87 and 88 of FIG. 8. Background shading addresses are associated with horizon shading channel 89. Bits 3, 4 and 5 of the address word identify which channel is being addressed. A "zero" in bit 3 position addresses the symbol channels which are further identified to a specific channel by bits 4 and 5. These are illustrated as types A and B in FIG. 8. A "one" in bit 3 position addresses the horizon shading channel. These are illustrated as types C and D of FIG. 9. The "zero" in bit 6 of address word 72 is associated with data words 73A and 73C. The "one" in bit 6 of address word 72 is associated with data words 73B and 73D. Words to the symbol channels 85, 86, 87 and 88 are transmitted during the vertical retrace interval. Words to the horizon shading channel are transmitted in two batches, one batch during the odd raster field scan, the second during the even raster field scan. As indicated in FIG. 8, the vertical retrace interval is a signal on line 37. The even-odd field identification is the electrical state of the least significant bit line of the four lines that comprise cable 56.

As discussed previously, about ten percent of the map portion of the memory bank is packed during any specific vertical retrace interval. Thus, about 100 map address words on bus 72 and 100 synchronized data words on bus 73 are transmitted during a typical vertical retrace interval. Word 73A is the data format of the word that is synchronized with map address format 72A. Bits 12 through 16 of word 72A identify the X location of the map which corresponds with the X location of the cell as identified by the count on cable 47 of FIG. 8. Bits 7 through 11 of word 72A identify the Y location of the map which corresponds with the Y location of the cell as identified by the count on cable 50 of FIG. 8. Bits 11 through 16 of word 73A identify which of 64 symbol addresses in the channel identified by bits 4 and 5 of word 72A is to be used in the cell identified by bits 7 through 16 of word 72A. Bits 7 through 10 of word 73A describe the number of segments or lines that the symbol format should be shifted in a direction as determined by bits 5 and 6 of word 73A. The priority of the symbol and video intensity is described by bits 1 through 4 of word 73A.

In general it is only necessary to pack the symbol locations of the memory words when power is first turned on since the vast majority of the symbols are used identically in multiple cells to generate the integrated flight instrument display format. As previously described, the symbol portion of the memory bank associated with each symbol channel has sufficient capacity to store 64 different symbol formats. Each symbol format is defined by sixteen 16 bit words. The method for packing the formats into the memory is achieved by transmitting words 72B and 73B simultaneously on buses 72 and 73 when bit 6 of the word on bus 72 is a "one". Bits 13 through 16 identify each of 16 lines in sequence. Bits 7 through 12 identify the location of the 16 positions for storing the 16 words which describe the pattern of the 16 lines. The 16 bit pattern for a specific line appears as word 73B in synchronization with the appropriate line address of word 72B.

Figure 12:
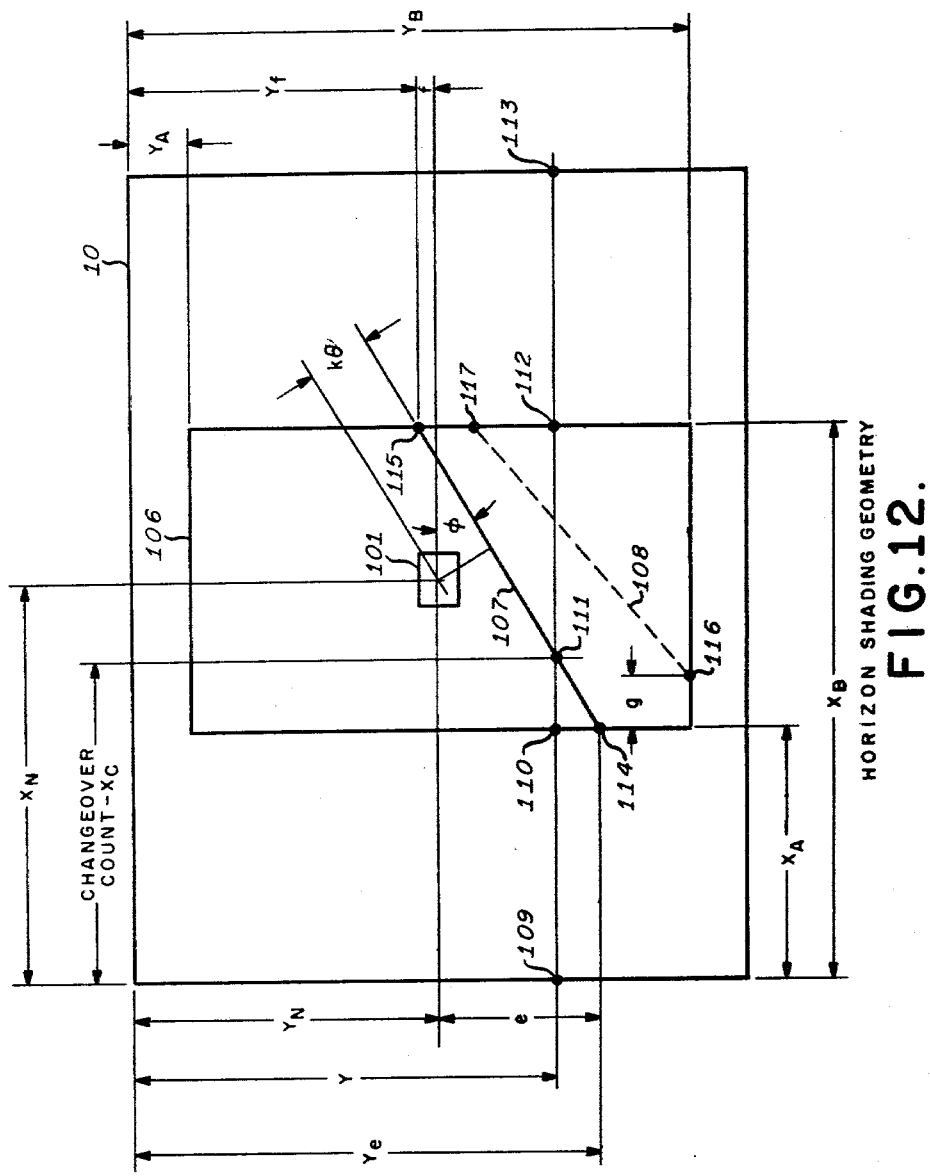
FIG. 12 is a diagram illustrating geometrical parameters utilized in generating the horizon shading.

The general case of displaying sky-ground shading is shown in FIG. 12. An area 106 of the face of the CRT screen 10 is comprised of an integral number of cells oriented with respect to the nose symbol 101 by means of horizontal dimensions $X_A$ and $X_B$ and vertical dimensions $Y_A$ and $Y_B$. The center of the nose symbol is located by dimensions $X_N$ and $Y_N$. The dimensions $X_A$, $X_B$, $Y_A$ and $Y_B$ are consistent with cell boundaries. Thus the dimensions $X_A$ and $X_B$ are detected when the "load" signal on lead 46, FIG. 8, indicates that the cathode ray beam has crossed the predetermined $X_A$ and $X_B$ cell boundaries. Two typical horizon lines are shown in FIG. 12. The solid horizon line 107 is one which starts at point 114 which is an $X_A$ boundary and terminates at point 115 which is an $X_B$ boundary. The dotted horizon line 108 is typical of horizon lines which have terminations at either the $Y_A$ or $Y_B$ boundary. Another type has terminations at both $Y_A$ and $Y_B$ boundaries.

The typical horizon line 107 indicates a positive bank angle (right wing down) and a positive pitch angle (nose above the horizon line). In accordance with the discussion of the typical display format of FIG. 2, the background shade of the cells outside of the area 106 is black; the area above the horizon line 107 within area 106 is sky shade; the area below the horizon line 107 within area 106 is ground shade. The beam which generates a typical raster line Y scans horizontally from point 109 at the left boundary of area 10 to point 113 at the right boundary of area 10. If the raster line is located vertically between points 114 and 115, the light intensity changes from black to sky shade at point 110, remains sky shade to point 111 where it changes from sky shade to ground shade between points 111 and 112 and back to black between points 112 and 113. Raster lines between the top of area 106 and point 115 have transition points from black to sky shade and back to black only at the $X_A$ and $X_B$ boundaries. A similar situation exists below point 114 and the bottom boundary of area 106 except that the transition is from black to ground shade and back to black. The data word which describes the background shading of a specific raster line is 73D on FIG. 9. Bits 3 and 4 are used to describe which of four levels of illumination should be applied to the raster line as it traverses the boundaries between the $X_A$ and $X_B$ cells. The video level for raster lines between the top of area 10 and area 106 is black. The video level for raster lines between the bottom of area 106 and the bottom of area 10 is also black. The video level code for raster lines between the top and bottom of area 106 is determined by the video level required when the beam passes the $X_A$ boundary. This could be either sky shade or ground shade depending on the magnitudes and polarities of the pitch and roll attitudes of the aircraft. This determination is, of course, made by the digital processor 84. If a transition point such as point 111 occurs between the $X_A$ and $X_B$ boundaries, the video code will be changed at the changeover count $X_C$. If the initial video level is sky shade, it will change to ground shade; if the initial video level is ground shade, it will change to sky shade. Bits 8 through 16 of data word 73D defines the changeover point at which the video level code will be altered.

The $X_A$ and $X_B$ boundaries are stored when power is first turned on by address word 72C which is defined by a "one" in bit 3 and a "zero" in bit 6. The applicable data word will be that shown at 73C.

As indicated in FIG. 12, the vertical distances from the nose symbol to the terminations of horizon line 107 are given as e and f. From the geometry of FIG. 12 it follows that:

$$e = \frac{k\theta}{\cos \phi} + (X_N - X_A) \tan \phi$$
$$f = \frac{k\theta}{\cos \phi} - (X_B - X_N) \tan \phi$$

where $\phi$ is bank angle, $\theta$ is pitch angle and k is the pitch scale factor. With the horizon line in the position illustrated at 108, the location of termination 116 is given by g as follows:

$$g = \left( (X_N - X_A) \tan \phi + \frac{k\theta}{\cos \phi} - (Y_B - Y_N) \right) \tan \phi$$

The location of point 111 is $X_C$:

$$X_c = \frac{Y_N + e - Y}{\tan \phi}$$

It may be desirable in some applications that the horizon line 107 not be confined to the area 106 but instead extend over the entire display area 10, in which case the dimensions illustrated will be correspondingly altered.

Figure 13:
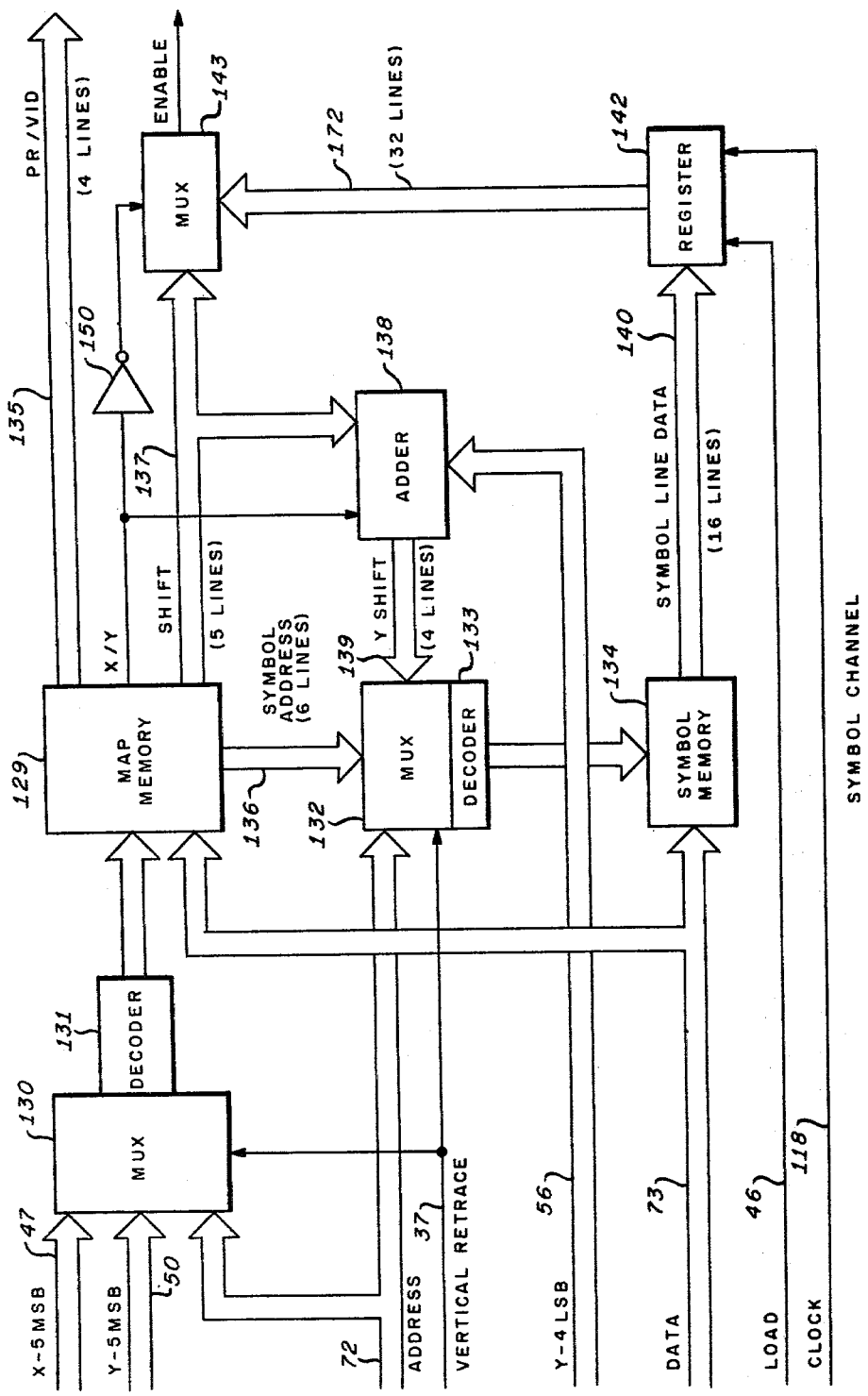
FIG. 13 is a schematic block diagram illustrating details of the symbol channel of FIG. 8.

FIG. 13 is a block diagram of the apparatus within each of the symbol channels 85, 86, 87 and 88 of FIG. 8. The function of the symbol channels is to convert the data on buses 72 and 73 of the display processor 5 into sets of four lines whose electrical states can be decoded to define the intensity level and priority to be assigned to each PEL of the 512×512 matrix on the screen 10 of the CRT 30 and also to transmit a simultaneous signal which indicates that the specific PEL should or should not be illuminated. The four lines of each symbol channel are identified in FIG. 8 as cables 119, 120, 121 and 122 respectively. In FIG. 13 these lines are designated as "PR/VID". The illumination signal is designated "ENABLE" and appears on lines 124, 125, 126 and 127 of FIG. 8.

The addresses on bus 72 which are applicable to the symbol channels are those designated 72A and 72B on FIG. 9. As previously discussed, the data words 73A and 73B will be synchronous with the address words, both of which will be transmitted to the proper symbol channel as determined by the state of bits 4 and 5 of the address word during the vertical retrace time interval which is determined by the length of the pulse that appears on line 37, which signal will configure multiplexer 130 and decoder 131 to address the appropriate position of the 1024 positions of map memory 129 and allow the 16 bit data word 73A on bus 73 to be entered therein. The multiplexer 132 and associated decoder 133 is used to address the 1024 positions of the symbol memory 134. During the vertical retrace interval the multiplexer is configured to allow the symbol memory to be loaded with data words 73B on bus 73 in accordance with addresses on bus 72.

The readout of the contents of the map memory 129 is determined by the states on the ten lines that comprise the five most significant bits on the X and Y cables 47 and 50. Readout can be obtained when the vertical retrace signal on line 73 is absent. This will configure the multiplexer 130 to allow the data on cables 47 and 50 to address the appropriate cell in map memory 129 as described in said Ser. No. 630,833. The readout is in the form of electrical states on 16 lines from map memory 129. Four of the lines are concerned with priority and video level and appear on cable 135. Six lines are concerned with addressing the symbol memory 134 through multiplexer 132 and decoder 133. These lines appear on cable 136. Five lines are concerned with the polarity and magnitude of symbol shift. These appear on cable 137. The electrical state of the X/Y line determines whether the shift is in the X or Y direction. This signal is applied to adder 138 or to multiplexer 143 through a signal inverter 150. The adder 138 utilizes the states on cables 137 and the four least significant bits of Y on cable 56 to shift a symbol in the Y direction by addressing the multiplexer 132 through cable 139 to shift the addressed symbol in memory 134, which, in turn, provides states on 16 lines from memory 134. These appear on cable 140 and provide a description of the illumination of each of the segments of a raster line in a specific cell. The electrical states of the 16 lines of cable 140 that describe the format of the symbol line are entered into a 32 bit shift register 142, the 16 rightmost bits of which are preset to "zero". The register is emptied simultaneously from each bit position over 32 individual lines which form cable 172 by 16 clock pulses on line 118. The pulses are initiated by the "load" signal 46 which signifies that the CRT beam has entered the applicable display cell that is being addressed. The simultaneous transmission of the pulse train from each individual shift register position results in the availability of 32 formats which differ from each other by one bit in sequence. The multiplexer 143 uses the shift data from the five lines of cable 137 in conjunction with the X/Y signal from inverter 150 to choose the proper pulse train from the 32 that are available on cable 172.

Thus it will be appreciated that by the inclusion of the adder 138 and the multiplexer 143 in conjunction with the shift bits 5-10 of data word 73A that the addressed symbol stored in a 16 by 16 matrix of the symbol memory 134 can be shifted controllably up and down or right and left under control of the shift bits 5-10 so as to effect symbol motion as described above. Motion in the Y direction is effected utilizing the adder 138 which adds or subtracts, under control of bit 6 of data word 73A, the shift data of bits 7-10 of the data word to the Y address data on the cable 56 providing a shifted address to the symbol memory 134. Thus one of the 16 lines of the addressed symbol in the symbol memory 134 is addressed by this combined data which address is shifted with respect to the address on the cable 56 by the amount called for by the data word 73A.

Figure 14:
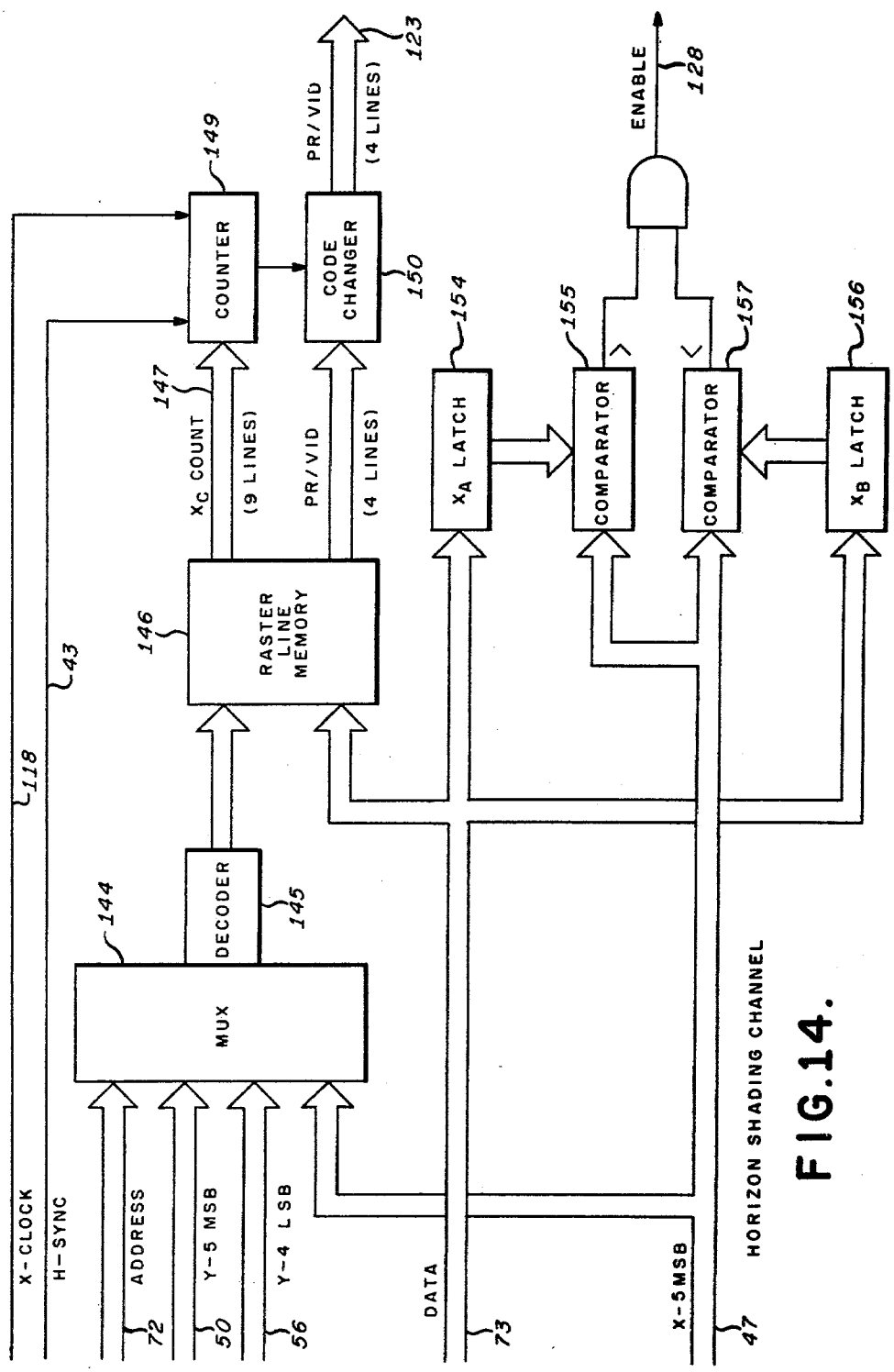
FIG. 14 is a schematic block diagram illustrating details of the horizon shading channel of FIG. 8.

Shifting in the X direction is accomplished utilizing the multiplexer 143 by effectively connecting the enable line to any one of the 32 stages of the register 142 thus tapping into any portion of the stored symbol line so as to effect X shifts in accordance with the bits 6-10 of the data word 73A. The configuration of the horizon shading channel 89 is shown in FIG. 14. The function of the horizon shading channel is to convert the data on bus 73 into sky-ground shades in the area 106 of FIG. 12. The format of the output is similar to that of the symbol channels previously discussed; that is, four lines of coded priority and video level on cable 123 and PEL on-off illumination on line 128. The configuration of the multiplexer 144 and decoder 145 is determined by the least significant bit of the four lines of cable 56. The state of the least significant bit identifies the odd and even fields of the raster lines. The multiplexer 144 switches addresses in a manner which loads memory 146 with odd field data from cable 73 while the even field data is unloaded from the memory and vice versa. The address and data words on cables 72 and 73 correspond to the C and D words shown in FIG. 9. The raster line memory has 512 positions, each capable of storing a 16 bit word. The memory positions are addressed when there is "one" in bits 3 and 6 of the word on bus 72. The 16 bit word loaded into the memory is that shown as 73D in FIG. 9. Bits 1 through 4 of the data word define the priority and video level of each raster line as it traverses the area 106 of FIG. 12 as previously discussed.

The output of the raster line memory 146 is 9 lines on cable 147 whose states reflect the $X_C$ count consistent with the changeover point 111 of FIG. 12 and 4 lines on cable 148 whose states reflect the priority and initial video level of a specific raster line within area 106 of FIG. 12. The horizontal sync pulse on line 43 will initiate a countdown of counter 149 which is filled with the $X_C$ count from cable 148. The countdown is completed when the X clock pulses reduce the counter 149 to zero. The zero level pulse from the counter will determine the instant when the video level transitions. The pulse will change the video level code by means of code changer 150. The video bits 3 and 4 of data word 73D provide either ground shading video coding or sky shading video coding in accordance with the shading required when the beam crosses the boundary $X_A$. Since ground shading is controlled by video bits "01" and sky shading is controlled by video bits "10", the code change 150 controls the appropriate video between $X_A$ and $X_C$ in accordance with that provided by the video bits 3 and 4 and provides the complement thereof when the counter 149 provides its zero level pulse. The output is four lines on cable 123 which reflects the priority and video level of the raster line between the $X_A$ and $X_B$ boundaries of the area 106.

The data on cable 73 (word 73C) is also used as an input to latches 154 and 156. These latches reflect the $X_A$ and $X_B$ cell boundaries of area 106. The latched data is compared with the states of the 5 lines which comprise the five most significant bits of the X position on cable 47 by means of comparators 155 and 157. The output of comparator 155 goes "high" when the X position is greater than the $X_A$ cell. The output of comparator 157 goes "low" when the X position is greater than the $X_B$ cell. Both comparator outputs go through an AND gate 158 thus turning on the enable signal on line 128 whenever the raster line is between the $X_A$ and $X_B$ boundaries.

FIG. 15 is a diagram of the video encoder 65 of FIG. 8. The function of the video encoder is to gather the data on the "VID/PR" and "ENABLE" lines from each of the symbol channels 85, 86, 87, 88 and the horizon shading channel 89 and organize the data such that each PEL of the 512×512 matrix on the CRT screen 10 has the brightest shade of the highest priority channel that exists at any given instant as explained in said Ser. No. 630,833. The output is two lines of digital video level data on cable 66. The electrical states of the two lines define four levels of light output. This data is converted from digital format to analog in the DAC 67 which drive the video amplifier 32.

The video encoder includes five decoders 159, 160, 161, 162, 163, one for each of the symbol channels and one for the horizon shading channel. Each decocder operates on the electrical states of the five lines and converts the data into a total of 16 lines from each decoder. These are shown as cables 164, 165, 166, 167, 168 on FIG. 14. At any one instant only one line of the 16 can be "high". This will define the PEL priority and video level that is assigned by the particular channel. Those lines from each group of 16 which represent the same priority and video level are connected together by "OR" gates 169 to form an integrated output of 16 lines on cable 170. These are tied to a conventional priority encoder to provide a two wire output on cable 66.

Specifically each of the decoders 159-163 comprises a conventional binary four bit to 1-of-16 binary decoding circuit which is enabled or disabled in accordance with the binary state of the enable bit. The priority and video bits from the data words form a four bit number, the two most significant bits representing priority and the two least significant bits representing video. These four bits are decoded in a conventional manner into the 1-of-16 lines illustrated. At the output of the OR gates 169, the 1-of-16 lines that corresponds to the highest priority from any of the five channels, or if of the same priority of the highest video within that priority, is encoded in a conventional manner into the two bits of the video corresponding to the enabled 1-of-16 lines. In effect the encoder 171 encodes the 1-of-16 lines into four bits discarding the two priority bits.

It will be appreciated from the foregoing that symbol motion is effecaciously achieved by utilizing the shift field bits 5-10 of the data word 73A in combination with the adder 138 and the muliplexer 143 of FIG. 13. It is further appreciated that the sky-ground shading pattern illustrated in FIG. 2 is provided by the unique apparatus of FIG. 14 in combination with the data word 73D stored in the raster line memory 146 of FIG. 14. The memory 146 is addressed by the 9 bits of the raster generating Y counter thereby addressing the data word 73D associated with the raster line that the beam is scanning. It is also appreciated that the unique display effects described above are further contributed to by the priority system described with respect to bits 1-4 of data words 73A and 73D in combination with the apparatus described with respect to FIG. 15, which priority technique is also described in said Ser. No. 630,833. Utilizing this system, symbology is overlapped as described, for example, with respect to FIG. 4 where the moving scale and numerics disappear behind the digital airspeed readout and emerge from the other side thereof.

The apparatus described hereinabove provides the novel aircraft displays illustrated and described with respect to FIGS. 2, 3, 4, 6, and 7. It will be appreciated that these displays are conveniently provided by utilizing the Sperry Flight System B-1 processor as the digital processor 84 of FIG. 9. The B-1 processor is procurable from the Sperry Rand Corporation, Phoenix, Arizona. The B-1 processor is a conventionally configured geneal purpose digital computer programmed to provide the displays described above. The program, which is loaded into the memory of the processor 84, for generating the displays is included as an appendix hereto. The program is provided in the VS 3C assembly language for the B-1 processor.

While the invention has been described in its preferred embodiment, it is to be understood that the words which have been used are words of description rather than of limitation and that changes within the purview of the appended claims may be made without departing from the true scope and spirit of the invention in its broader aspects.

We claim:

1. Display apparatus for aircraft for indicating to the pilot the pitch and roll attitude of the aircraft comprising:
   (a) means defining a display field of view including a reference index generally in the center of said field and having the general shape of an aircraft and comprising a fuselage portion and wing portions laterally extending therefrom, (b) means for providing a horizon defining line in said field and including means responsive to the pitch and roll attitude of said craft for correspondingly positioning said horizon line relative to said reference index,
   (c) means for providing a roll attitude reference scale comprising a zero roll attitude pointer and plurality of roll attitude graduation marks extending in predetermined spaced relation vertically above and below said zero roll attitude pointer for representing predetermined angles of roll attitude of said craft by the position of said horizon defining line relative to said roll graduation marks, said scale being located generally adjacent a wing tip of said reference index, and (d) means responsive to a predetermined function of the pitch and roll attitude of said craft for moving said zero roll attitude pointer vertically relative to said index wing tip and simultaneously varying the relative spacing between said roll attitude graduation marks, whereby said horizon defining line will be aligned with said roll graduation marks at corresponding pitch and roll attitudes of said aircraft.

2. The display apparatus as set forth in claim 1 wherein said roll attitude graduation marks are short straight lines and wherein said predetermined function of the pitch and roll attitude of said craft maintains said linear roll attitude graduation marks aligned with said horizon line at said corresponding pitch and roll attitudes of said aircraft.

3. The display apparatus as set forth in claim 1 further comprising a pitch attitude reference scale having a zero pitch attitude graduation adjacent said reference index wing tip and a plurality of pitch attitude graduations extending vertically above and below said zero pitch attitude graduation, said zero roll attitude pointer indicating the pitch attitude of the aircraft on said scale.

4. The display apparatus as set forth in claim 1 wherein the fuselage portion of said aircraft reference index has a finite area and further including means for providing a numeric indication of a craft parameter related to pitch attitude within said reference index fuselage area.

5. The display apparatus as set forth in claim 3 further comprising
(a) means for limiting the pitch motion of said horizon defining line for aircraft pitch attitudes greater than a predetermined value to thereby maintain said horizon line within said field of view and for correspondingly limiting the motion of said roll pointer and roll graduations, and
(b) means responsive to pitch attitudes greater than said predetermined value for moving said pitch attitude graduations relative to said reference index wing tip in a direction such that said zero roll attitude pointer indicates the actual pitch attitude of the craft greater than said predetermined value.

6. Display apparatus for aircraft for indicating to the pilot the pitch and roll attitude of the aircraft comprising
(a) means defining a display field of view including a reference index generally in the center of said field and having the general shape of an aircraft comprising a fuselage portion and wing portions laterally extending therefrom,
(b) means for providing a horizon defining line in said field and including means responsive to the pitch and roll attitude of the craft for correspondingly positioning said horizon line relative to said reference index,
(c) means for providing a roll attitude reference scale comprising a plurality of roll attitude graduations extending in predetermined spaced relation vertically in said display field and representing predetermined angles of roll attitude of said craft,
(d) means responsive to a predetermined function of the pitch and roll attitude of the aircraft for moving said roll attitude reference scale vertically relative to said aircraft reference index and simultaneously varying the relative spacing between said graduations,
(e) means providing a pitch attitude reference pointer generally aligned with said aircraft reference index wing tip and a scale of numeric aircraft pitch attitude generally vertically parallel to said roll reference scale, and
(f) means responsive to the pitch attitude of the aircraft for moving said pitch scale relative to said pitch pointer in a direction opposite to the movement of said horizon line.

7. The display apparatus as set forth in claim 6 further includng
(a) means for limiting the pitch motion of said horizon line and correspondingly limiting the pitch motion of said roll scale for aircraft pitch attitudes greater than a predetermined value less than the maximum actual pitch attitude capable of being displayed in said field of view to thereby maintain the position of said horizon line and the position of said roll scale within said field of view for pitch attitudes greater than said predetermined value, and
(b) means responsive to pitch attitudes greater than ninety degrees for reversing the limited horizon line position in said field of view and for maintaining said roll scale at said limited position thereof in said field of view.

8. The display apparatus as set forth in claim 7 wherein the fuselage portion of said aircraft reference index has a finite area and further providing a numeric indication of a flight parameter related to aircraft pitch attitude within said reference index fuselage area.

9. Flight director display apparatus for aircraft for indicating to the pilot the pitch and roll commands required to cause said aircraft to approach and thereafter maintain a desired flight path comprising
(a) means defining a display field and including a reference index generally in the center of said field, said reference index having the general shape of an aircraft including a fuselage portion of finite substantially symmetrical area and a pair of wings extending laterally from said fuselage portion and spaced therefrom,
(b) a flight director symbol comprising right-left pointing triangularly shaped arrowheads and up-down pointing triangularly shaped arrowheads respectively connected by arrow shaft lines, the spacing between the bases of said arrowheads defining a finite area corresponding to the area of said reference index fuselage portion, whereby when said commands are satisfied, said arrowheads project symmetrically beyond said index fuselage portion.

10. Display apparatus for aircraft for indicating to the pilot the progress of aircraft airspeed during take-off and climb comprising
(a) means defining a display field of view including a reference index generally in the center thereof,
(b) a vertically elongated, narrow area within and at one side of said field of view for indicating aircraft airspeed related parameters to the pilot, and having a line defining an edge of said narrow area,
(c) means responsive to craft airspeed for providing a numeric scale movable along one side of said line in accordance with changes in craft airspeed and including a numeric indication of instantaneous airspeed in substantial horizontally fixed alignment with said reference index, (d) reference airspeed index means corresponding to desired operating airspeeds located on the opposite side of said line, and (e) means for moving said reference airspeed index means with said numeric scale when the values of said numeric scale correspond to said reference airspeeds.

11. The display apparatus as set forth in claim 10 wherein said reference airspeed index means comprises reference takeoff airspeeds corresponding to decision speed $V_1$, rotation speed $V_R$ and safety speed $V_2$.

12. The display apparatus as set forth in claim 11 further comprising (a) means for obscuring said airspeed scale for airspeeds below said safety speed and for displaying said scale at airspeeds above said safety speed.

13. The display apparatus as set forth in claim 10 further including (a) means for obscuring said movable airspeed scale in the area occupied by said numeric indication of instantaneous airspeed.

14. Display apparatus for aircraft for providing the pilot with an indication of the rate of climb and dive of the aircraft comprising (a) means defining a display field of view including a reference index generally at the center thereof, (b) a vertically elongated narrow area within and at one side of said field of view for indicating to the pilot the rate of climb and dive of the aircraft and having a line defining an edge of said narrow area, (c) a fixed numeric scale on one side of said line including a zero rate of climb and dive index in substantially horizontal alignment with said reference index and extending thereabove and therebelow a finite distance corresponding to predetermined values of rates of climb and dive respectively, (d) a movable pointer located on the opposite side of said line and means responsive to craft rate of climb and dive for moving said pointer above and below said zero index respectively and for limiting said motion for rates of climb and dive greater than said predetermined rates, and (e) a plurality of horizontally short graduation marks vertically disposed adjacent said narrow area and means responsive to said craft rate of climb and dive for moving said marks at a rate corresponding thereto and in directions opposite to the movement of said movable pointer.

15. The display apparatus as set forth in claim 14 further including areas at each end of said rate of climb and dive scale, and means for providing a numeric indication of actual rate of climb and dive of the aircraft for values thereof greater than said predetermined values.

16. The display apparatus as set forth in claim 10 further including means for obscuring said airspeed scale values corresponding to airspeeds greater than maximum operating speed.

17. The display apparatus as set forth in claim 10 further including means for at least partially obscuring said airspeed scale values corresponding to airspeeds less than stall margin speed and greater than flap placard speed.

18. Display apparatus for aircraft for providing the pilot with an indication of altitude and vertical speed of the aircraft comprising (a) means defining a display field of view including an aircraft reference index generally at the center thereof, (b) a pair of vertically elongated narrow areas within and at one side of said field of view, one of said areas for indicating to the pilot the altitude progress of the aircraft and the other the vertical speed progress of the aircraft, each narrow area having a line defining an edge thereof, (c) a movable altitude scale including altitude numerics increasing in value from the bottom of said scale to the top thereof on one side of one of said lines and a fixed index on the opposite side thereof in substantial horizontal alignment with said aircraft reference index and means responsive to the altitude of the aircraft for moving said scale downward for increasing altitudes and vice versa, (d) a fixed vertical speed scale on one side of the other of said lines including vertical speed numerics increasing in value from a zero index, said zero index being in substantial horizontal alignment with said aircraft reference index and including a vertical speed pointer on the opposite side of said other line and means responsive to the vertical speed of the aircraft for moving said pointer upwardly and downwardly in accordance with upward and downward aircraft vertical speeds, and (e) a plurality of horizontally short graduation marks vertically disposed adjacent said movable altitude scale and means responsive to said craft vertical speed for moving said graduation marks at a rate corresponding thereto and in a direction opposite to the movement of said altitude scale.

19. Display apparatus for aircraft for providing the pilot with an indication of the wind shear being experienced by the aircraft during an approach to a landing runway comprising, (a) means defining a display field of view, (b) a vertically elongated narrow area within said field of view including a vertical line defining an edge thereof, (c) a fixed numeric scale on one side of said line and representing values of wind speed as a function of aircraft altitude, (d) a pointer on the opposite side of said line cooperating with said scale, and (e) means for positioning said pointer relative to said scale in accordance with the difference between the wind speed at the aircraft and the wind speed at the landing runway said difference divided by the instantaneous altitude of the craft above the landing runway.

* * * * *